(12) United States Patent
Thorpe

(10) Patent No.: US 7,502,780 B2
(45) Date of Patent: Mar. 10, 2009

(54) INFORMATION STORAGE AND RETRIEVAL

(75) Inventor: Jonathan Richard Thorpe, Winchester (GB)

(73) Assignee: Sony United Kingdom Limited, Weybridge (GB)

( * ) Notice: Subject to any disclaimer, the term of this patent is extended or adjusted under 35 U.S.C. 154(b) by 749 days.

(21) Appl. No.: 10/720,548

(22) Filed: Nov. 24, 2003

(65) Prior Publication Data

US 2004/0107194 A1    Jun. 3, 2004

(30) Foreign Application Priority Data

Nov. 27, 2002    (GB)    ................................ 0227692.1

(51) Int. Cl.
*G06F 17/30*    (2006.01)

(52) U.S. Cl. ........................ 707/3; 707/2; 707/4; 707/5; 700/47

(58) Field of Classification Search .................. 707/2–5; 700/47

See application file for complete search history.

(56) References Cited

U.S. PATENT DOCUMENTS

| | | | |
|---|---|---|---|
| 5,794,178 A | 8/1998 | Caid et al. ........................ | 704/9 |
| 5,819,245 A * | 10/1998 | Peterson et al. ............... | 706/16 |
| 5,847,708 A * | 12/1998 | Wolff .......................... | 715/764 |
| 5,963,965 A | 10/1999 | Vogel .......................... | 707/501 |
| 5,987,460 A | 11/1999 | Niwa et al. ..................... | 707/6 |
| 6,621,926 B1 * | 9/2003 | Yoon et al. ................... | 382/168 |
| 6,721,759 B1 * | 4/2004 | Rising, III ................ | 707/104.1 |

(Continued)

FOREIGN PATENT DOCUMENTS

WO    WO 02/27508    *    4/2002

OTHER PUBLICATIONS

Xia Lin, et al. "A Self-Organizing Semantic Map for Information Retrieval". Proceedings of The Annual International ACM/SIGIR Conference on Research and Development in Information Retrieval, XP-000239177, vol.conf. 14, Oct. 13, 1991, pp. 262-269.*

(Continued)

*Primary Examiner*—Charles Rones
*Assistant Examiner*—Phuong-Thao Cao
(74) *Attorney, Agent, or Firm*—Oblon, Spivak, McClelland, Maier & Neustadt, P.C.

(57) ABSTRACT

An information retrieval apparatus for searching a set of information items. The apparatus comprises a mapping processor, a graphical user interface, a user control and a search processor. The mapping processor is operable to generate data representative of a map of information items from a set of information items. The map provides the information items with respect to positions in an array in accordance with a mutual similarity of the information items, similar information items mapping to similar positions in the array. The graphical user interface displays a representation of at least some of the information items, and the user control is provided for selecting an information item. The search processor is operable to perform a related search with respect to the user selected information item by identifying information items which correspond to neighboring position in the array with respect to the array position corresponding to the user selected information item. Since the search processor is arranged to identify information items in the search from the array rather than by searching the information items for some characterizing information feature, such as a keyword, searching for information items of interest can be effected with a reduced complexity.

13 Claims, 17 Drawing Sheets

U.S. PATENT DOCUMENTS

2002/0055919 A1* 5/2002 Mikheev .................. 707/3
2002/0069218 A1* 6/2002 Sull et al. ................ 707/501.1
2002/0105541 A1* 8/2002 Endou et al. ............. 345/738

OTHER PUBLICATIONS

Chung-Hong Lee, et al. "A Multilingual Text-Mining Approach Based on Self-Organizing Maps for Semantic Web Mining". IEEE International Conference on Systems, Man and Cybernetics, vol. 2, Oct. 6-9, 2002, pp. 455-459.*

Lin, Xia et al., "A Self-organizing Semantic Map for Information Retrieval", ACM, 1991, p. 262-269. (Provided by Applicant).*

Jorma Laaksonen et al., "Content-Based Image Retrieval Using Self-Organizing Maps", VISUAL '99, LNCS 1614, pp. 541-549.*

Aghbari et al., "Topological Mapping: A dimentionality Reduction Method for Efficient Video Search", Proceedings of the 2002 ACM Symposium on Applied Computing, ACM 2002, pp. 470-475.*

"Self-organizing map browser for database retrieval", Kerminen et al., 6th ERCIM Workshop "User Interfaces for All", Oct. 25-26, 2000.

Kohonen et al., "Self Organization of a Massive Document Collection", IEEE Transactions on Neural Networks, vol. 11, No. 3, May 2000, pp. 574-585, 1045-9227/00.

Samuel Kaski, "Dimensionality Reduction by Random Mapping: Fast Similarity Computation for Clustering" pp. 413-418, 0-7803-4859-1/98.

Xia Lin, "A Self-organizing Semantic Map for Information Retrieval", Proceedings of the Annual International ACM/SIGIR Conference on Research and Development in Information Retrieval, XP-000239177, vol. conf. 14, Oct. 13, 1991, pp. 262-269.

Andreas Rauber, et al., "'Andreas, Rauber'? Conference Pages Are over There, German Documents on the Lower Left . . . " An "Old-Fashioned" Approach to Web Search Results Visualization, Database and Expert Systems Applications, Proceedings from the 11th International Workshop, IEEE, XP-010515556, Sep. 4, 2000, pp. 615-619.

Kun Seok Oh, et al., "Fast k-NN Image Search with Self-Organizing Maps", Lecture Notes in Computer Science: Image and Video Retrieval: International Conference, CIVR 2002, vol. 2383, Jul. 18, 2002, pp. 299-308.

Jorma Laaksonen, et al., "PicSOM: Self-Organizing Maps for Content-Based Image Retrieval", XP-10373164, 1999, pp. 2470-2473.

Bernhard Feiten, et al., "Automatic Indexing of a Sound Database Using Self-organizing Neural Nets", XP-001007764, 1994, pp. 53-65.

* cited by examiner

Legend:
10 Computer
20 Processor unit
30 Disk storage
40 Network interface card
50 Network
60 Display
70 Keyboard
80 Mouse

| | |
|---|---|
| 0 | 0 |
| 0 | 0 |
| 0 | 3 |
| 0 | 0 |
| 1 | 1 |
| 0 | 0 |
| 0 | 7 |
| 0 | 0 |
| 0 | 0 |
| 0 | 0 |
| 2 | 2 |
| . | |
| . | Fig. 4b |
| . | |
| 0 | |
| 0 | |
| 0 | |
| 0 | |
| 3 | |

Fig. 4a

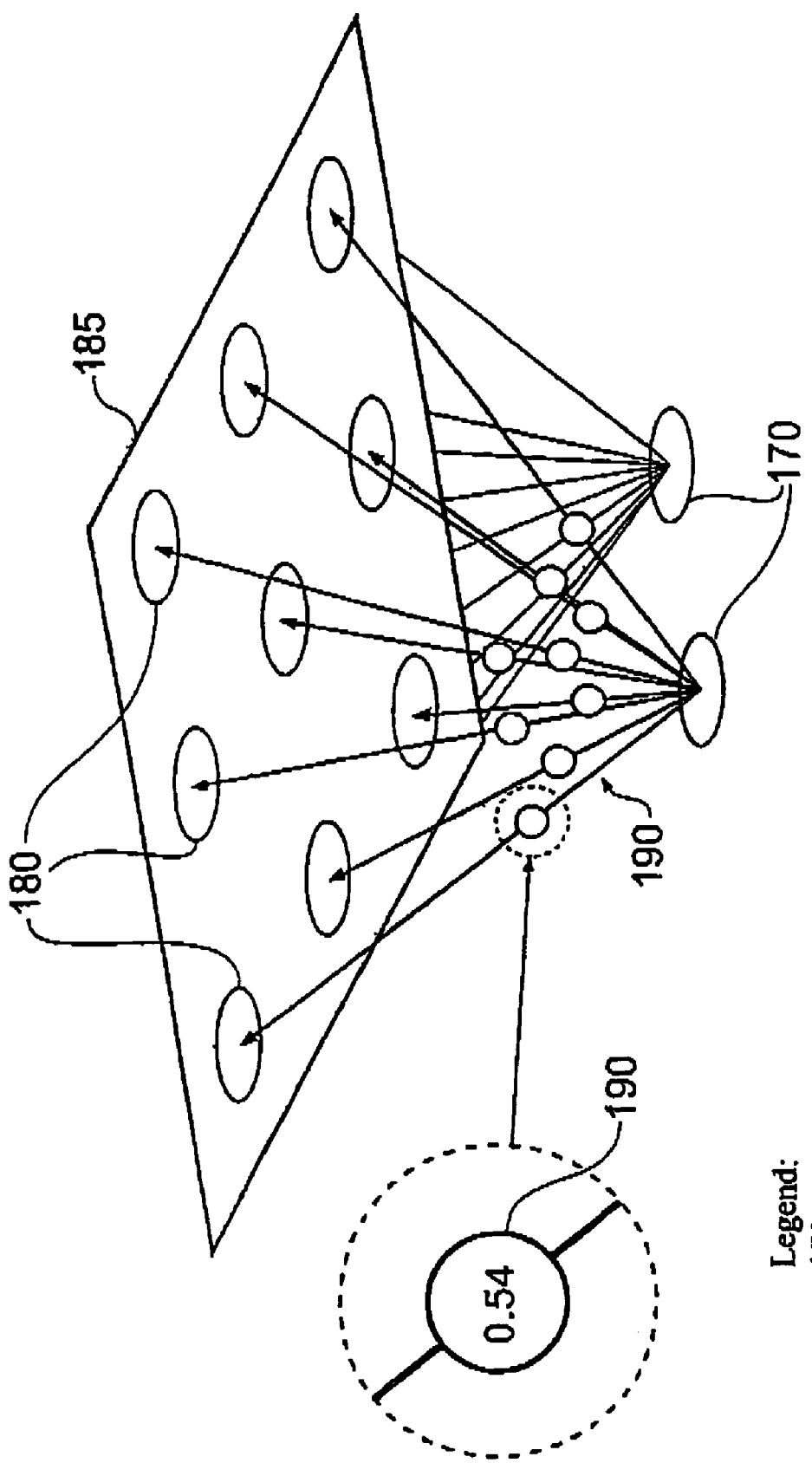

Legend:
200   Output node
210   Bounded area

Legend:
250  Search enquiry
260  Results list
270  SOM display area
280  Entry in results list
290  Cluster Legend:
250 Search enquiry
260 Results list
270 SOM display area
300 Boundary Legend:
250 Search enquiry
260 Results list
270 SOM display area

AND

Legend:
250 Search enquiry
260 Results list
270 SOM display area
490 Position of interest
492 Box
494 Circle

INFORMATION STORAGE AND RETRIEVAL

FIELD OF THE INVENTION

This invention relates to information retrieval apparatus and methods.

BACKGROUND OF THE INVENTION

There are many established systems for locating information (e.g. documents, images, emails, patents, internet content or media content such as audio/video content) by searching under keywords. Examples include internet search "engines" such as those provided by "Google"™ or "Yahoo"™ where a search carried out by keyword leads to a list of results which are ranked by the search engine in order of perceived relevance.

However, in a system encompassing a large amount of content, often referred to as a massive content collection, it can be difficult to formulate effective search queries to give a relatively short list of search "hits". For example, at the time of preparing the present application, a Google search on the keywords "massive document collection" drew 243000 hits. This number of hits would be expected to grow if the search were repeated later, as the amount of content stored across the internet generally increases with time. Reviewing such a list of hits can be prohibitively time-consuming.

In general, some reasons why massive content collections are not well utilised are:
- a user doesn't know that relevant content exists
- a user knows that relevant content exists but does not know where it can be located
- a user knows that content exists but does not know it is relevant
- a user knows that relevant content exists and how to find it, but finding the content takes a long time The paper "Self Organisation of a Massive Document Collection", Kohonen et al., IEEE Transactions on Neural Networks, Vol 11, No. 3, May 2000, pages 574-585 discloses a technique using so-called "self-organising maps" (SOMs). These make use of so-called unsupervised self-learning neural network algorithms in which "feature vectors" representing properties of each document are mapped onto nodes of a SOM.

In the Kohonen et al paper, a first step is to pre-process the document text, and then a feature vector is derived from each pre-processed document. In one form, this may be a histogram showing the frequencies of occurrence of each of a large dictionary of words. Each data value (i.e. each frequency of occurrence of a respective dictionary word) in the histogram becomes a value in an n-value vector, where n is the total number of candidate words in the dictionary (43222 in the example described in this paper). Weighting may be applied to the n vector values, perhaps to stress the increased relevance or improved differentiation of certain words.

The n-value vectors are then mapped onto smaller dimensional vectors (i.e. vectors having a number of values m (500 in the example in the paper) which is substantially less than n. This is achieved by multiplying the vector by an (n×m) "projection matrix" formed of an array of random numbers. This technique has been shown to generate vectors of smaller dimension where any two reduced-dimension vectors have much the same vector dot product as the two respective input vectors. This vector mapping process is described in the paper "Dimensionality Reduction by Random Mapping: Fast Similarity Computation for Clustering", Kaski, Proc IJCNN, pages 413-418, 1998.

The reduced dimension vectors are then mapped onto nodes (otherwise called neurons) on the SOM by a process of multiplying each vector by a "model" (another vector). The models are produced by a learning process which automatically orders them by mutual similarity onto the SOM, which is generally represented as a two-dimensional grid of nodes. This is a non-trivial process which took Kohonen et al six weeks on a six-processor computer having 800 MB of memory, for a document database of just under seven million documents. Finally the grid of nodes forming the SOM is displayed, with the user being able to zoom into regions of the map and select a node, which causes the user interface to offer a link to an internet page containing the document linked to that node.

SUMMARY OF THE PRESENT INVENTION

An object of the present invention is to provide improvements to information retrieval apparatus, and in particular to searches performed but such apparatus.

Various aspects and features of the present invention are defined in the appended claims.

According to one aspect of the present invention there is provided an information retrieval apparatus for searching a set of information items. The apparatus comprises a mapping processor operable to generate data representative of a map of information items from a set of information items. The map provides the identified information items with respect to positions in an array in accordance with a mutual similarity of the information items, similar information items mapping to similar positions in the array. A graphical user interface is operable to display a representation of at least some of the information items, and a user control is provided for selecting an identified information item. A search processor is operable to perform a related search with respect to the user selected information item by identifying information items which correspond to positions in the array which are neighbouring positions from the array position corresponding to the user selected information item. Since the search processor is arranged to identify information items in the search from the array rather than by searching the information items for some characterising information feature, such as a keyword, searching for information items of interest can be effected with a reduced complexity.

An advantage provided by embodiments of the invention is that if a user has identified an information item of interest from the set of information items, then the user may be provided with information items, which are strongly correlated. The correlated information items are provided by identifying items from the positions within the array which are a predetermined number of positions from the position in the array corresponding to the information item of interest.

In other embodiments, the search processor may be operable to search the information items in accordance with a search query and to identify information items corresponding to the search query. The mapping processor may be operable to generate the map data of information items identified by the search processor as a result of the search on the search query. The search processor may therefore perform an initial search to identify information items corresponding to a particular search query. As a result of the search the user may identify an information item of interest. Accordingly, an embodiment of the invention provides a facility for the user to search in accordance with a "find related" option, which identifies information items which correspond to array positions within a predetermined number of position of the array position corresponding to the information item of interest. To this end, the user control may provide a facility for initiating a find related search.

The graphical user interface is operable to display a representation of at least some of the positions of the array corresponding to identified information items as an n-dimensional display array of display points within a display area. Advantageously, to facilitate viewing and navigation the number of dimensions in the array is two. Accordingly, a position in the array is defined by x, y co-ordinates. Therefore in some embodiments, the search processor is operable to perform a related search by identifying information items which correspond to positions in the array which are within a circle having a radius of positions from the array position corresponding to the user selected information item.

In order to initiate the related search in accordance with a relative range of related items required, the user control may be arranged to provide the user with a facility for specifying the radius of positions in accordance with a relative similarity of the information item to be searched by the search processor in the related search.

Further respective aspects and features of the invention are defined in the appended claims.

BRIEF DESCRIPTION OF THE DRAWINGS

Embodiments of the invention will now be described, by way of example only, with reference to the accompanying drawings in which:

Figure 4A:
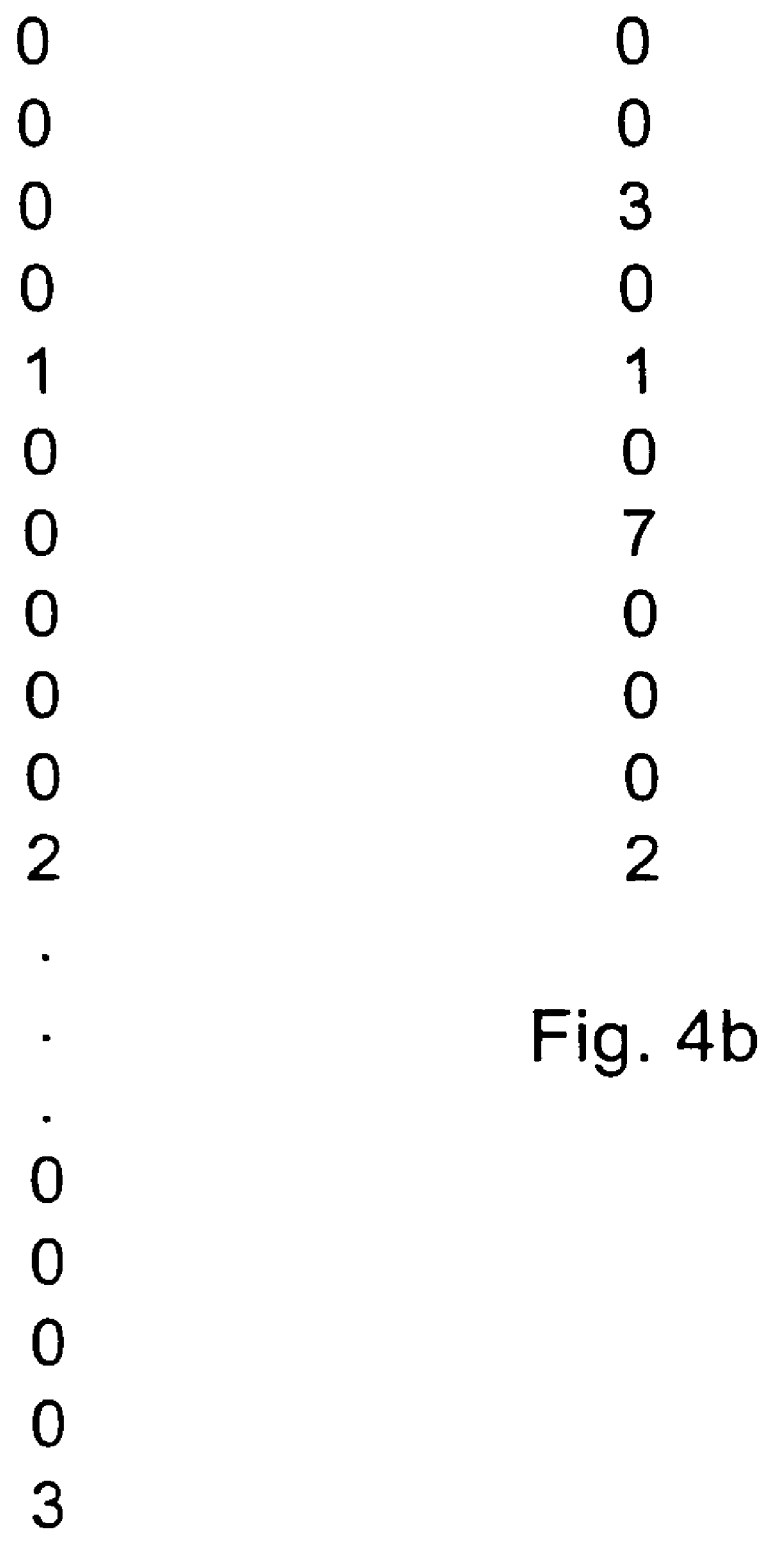

FIG. 4a schematically illustrates a raw feature vector;

FIG. 4b schematically illustrates a reduced feature vector;

FIG. 5 schematically illustrates an SOM;

DESCRIPTION OF PREFERRED EMBODIMENTS

Figure 1:
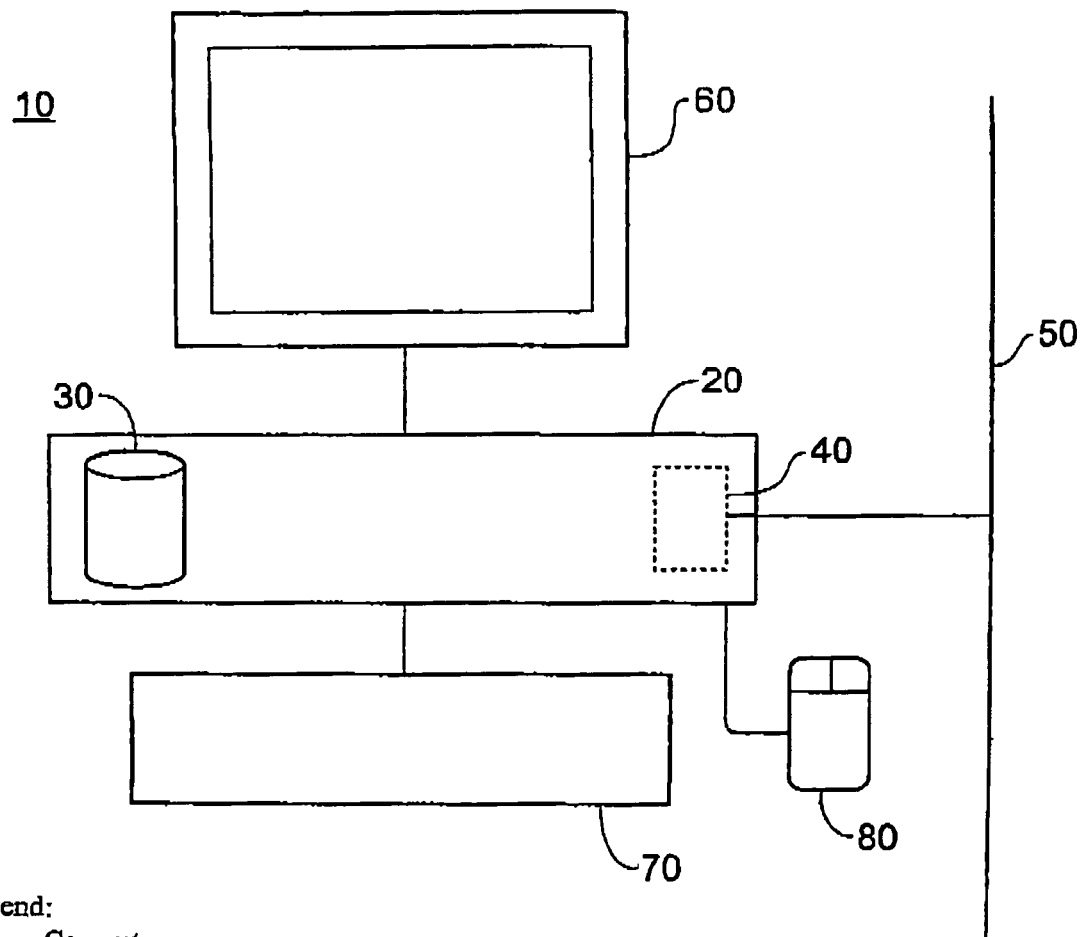
FIG. 1 schematically illustrates an information storage and retrieval system.

FIG. 1 is a schematic diagram of an information storage and retrieval system based around a general-purpose computer 10 having a processor unit 20 including disk storage 30 (an exemplary computer readable storage medium) for programs and data, a network interface card 40 connected to a network 50 such as an Ethernet network or the Internet, a display device such as a cathode ray tube device 60, a keyboard 70 and a user input device such as a mouse 80. The system operates under program control, the programs being stored on the disk storage 30 and provided, for example, by the network 50, a removable disk (not shown, but an example of a computer readable storage medium) or a pre-installation on the disk storage 30.

The storage system operates in two general modes of operation. In a first mode, a set of information items (e.g. textual information items) is assembled on the disk storage 30 or on a network disk drive connected via the network 50 and is sorted and indexed ready for a searching operation. The second mode of operation is the actual searching against the indexed and sorted data.

The embodiments are applicable to many types of information items. A non-exhaustive list of appropriate types of information includes patents, video material, emails, presentations, internet content, broadcast content, business reports, audio material, graphics and clipart, photographs and the like, or combinations or mixtures of any of these. In the present description, reference will be made to textual information items. The textual information items may be associated with, or linked to, non-textual items. So, for example, audio and/or video material may be associated with "MetaData" which is a textual information item defining that material in textual terms.

The information items are loaded onto the disk storage 30 in a conventional manner. Preferably, they are stored as part of a database structure which allows for easier retrieval and indexing of the items, but this is not essential. Once the information and items have been so stored, the process used to arrange them for searching is shown schematically in FIG. 2.

It will be appreciated that the indexed information items need not be stored on the local disk drive 30. The information items could be stored on a remote drive connected to the system 10 via the network 50. Alternatively, information may be stored in a distributed manner, for example at various sites across the internet. If the information is stored at different internet or network sites, a second level of information storage could be used to store locally a "link" (e.g. a Universal Resource Indicator URI) to the remote information, perhaps with an associated summary, abstract or metadata associated with that link. So, the remotely held information would not be accessed unless the user selected the relevant link (e.g. from the results list 260 to be described below), although for the purposes of the technical description which follows, the remotely held information, or the abstract/summary/metadata, or the link/URI could be considered as the "information item".

In other words, a formal definition of the "information item" is an item from which a feature vector is derived and processed (see below) to provide a mapping to the SOM. The data shown in the results list 260 (see below) may be the actual information item which a user seeks (if it is held locally and is short enough for convenient display) or may be data representing and/or pointing to the information item, such as one or more of metadata, a URI, an abstract, a set of key words, a representative key stamp image or the like. This is inherent in the operation "list" which often, though not always, involves listing data representing a set of items.

In a further example, the information items could be stored across a networked work group, such as a research team or a legal firm. A hybrid approach might involve some information items stored locally and/or some information items stored across a local area network and/or some information items stored across a wide area network. In this case, the system could be useful in locating similar work by others, for example in a large multi-national research and development organisation, similar research work would tend to be mapped to similar output nodes in the SOM (see below). Or, if a new television programme is being planned, the present technique could be used to check for its originality by detecting previous programmes having similar content.

It will also be appreciated that the system 10 of FIG. 1 is but one example of possible systems which could use the indexed information items. Although it is envisaged that the initial (indexing) phase would be carried out by a reasonably powerful computer, most likely by a non-portable computer, the later phase of accessing the information could be carried out at a portable machine such as a "personal digital assistant" (a term for a data processing device with display and user input devices, which generally fits in one hand), a portable computer such as a laptop computer, or even devices such as a mobile telephone, a video editing apparatus or a video camera. In general, practically any device having a display could be used for the information-accessing phase of operation.

The processes are not limited to particular numbers of information items.

Figure 2:
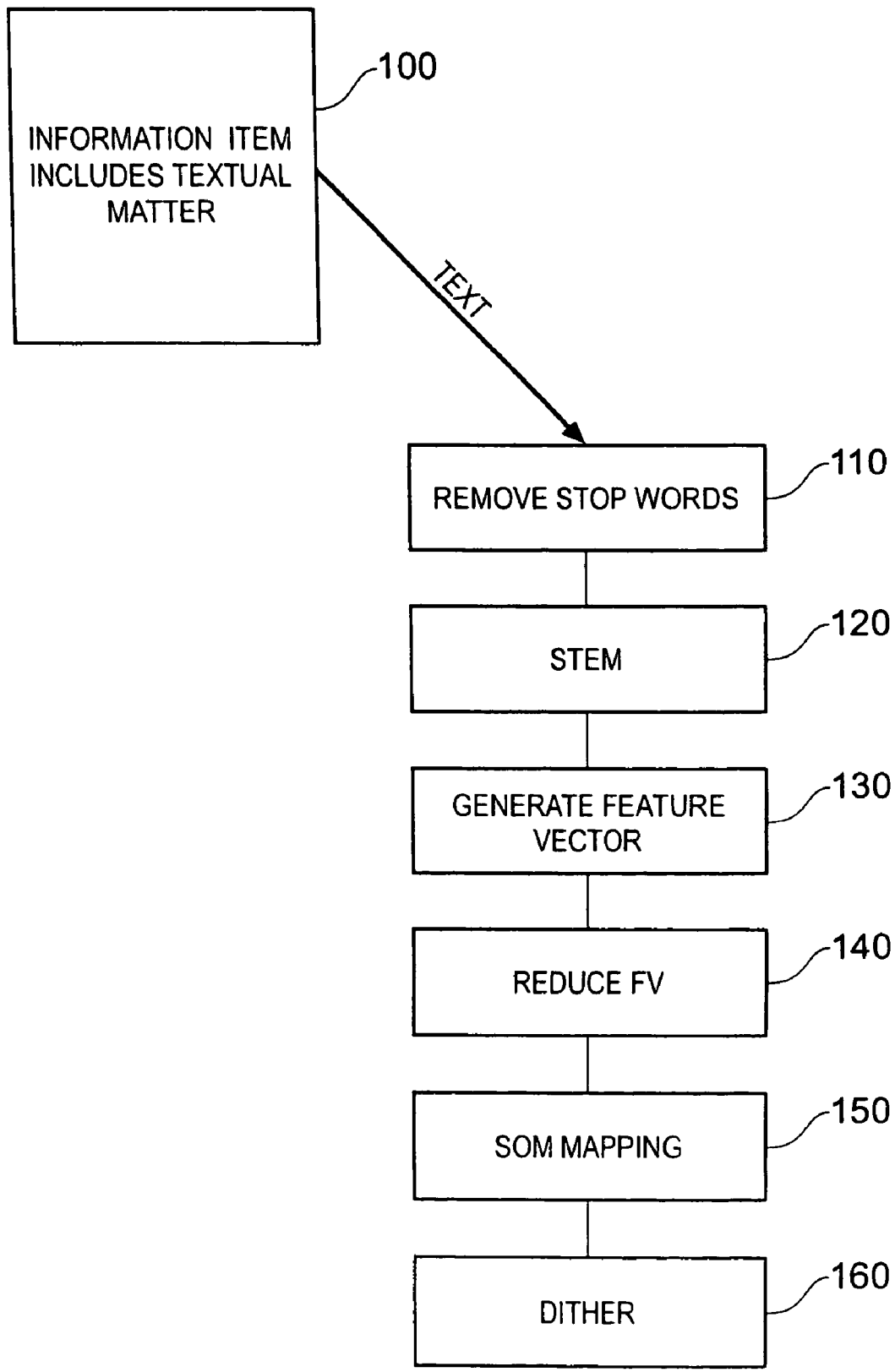
FIG. 2 is a schematic flow chart showing the generation of a self-organising map (SOM)

The process of generating a self-organising map (SOM) representation of the information items will now be described with reference to FIGS. 2 to 6. FIG. 2 is a schematic flow chart illustrating a so-called "feature extraction" process followed by an SOM mapping process.

Feature extraction is the process of transforming raw data into an abstract representation. These abstract representations can then be used for processes such as pattern classification, clustering and recognition. In this process, a so-called "feature vector" is generated, which is an abstract representation of the frequency of terms used within a document.

The process of forming the visualisation through creating feature vectors includes:
Create "document database dictionary" of terms
Create "term frequency histograms" for each individual document based on the "document database dictionary"
Reduce the dimension of the "term frequency histogram" using random mapping
Create a 2-dimensional visualisation of the information space.

Considering these steps in more detail, each document (information item) 100 is opened in turn. At a step 110, all "stop words" are removed from the document. Stop-words are extremely common words on a pre-prepared list, such as "a", "the", "however", "about", "and", and "the". Because these words are extremely common they are likely, on average, to appear with similar frequency in all documents of a sufficient length. For this reason they serve little purpose in trying to characterise the content of a particular document and should therefore be removed.

After removing stop-words, the remaining words are stemmed at a step 120, which involves finding the common stem of a word's variants. For example the words "thrower", "throws", and "throwing" have the common stem of "throw".

A "dictionary" of stemmed words appearing in the documents (excluding the "stop" words) is maintained. As a word is newly encountered, it is added to the dictionary, and running count of the number of times the word has appeared in the whole document collection (set of information items) is also recorded.

The result is a list of terms used in all the documents in the set, along with the frequency with which those terms occur. Words that occur with too high or too low a frequency are discounted, which is to say that they are removed from the dictionary and do not take part in the analysis which follows. Words with too low a frequency may be misspellings, made up, or not relevant to the domain represented by the document set. Words that occur with too high a frequency are less appropriate for distinguishing documents within the set. For example, the term "News" is used in about one third of all documents in a test set of broadcast-related documents, whereas the word "football" is used in only about 2% of documents in the test set. Therefore "football" can be assumed to be a better term for characterising the content of a document than "News". Conversely, the word "foonball" (a misspelling of "football") appears only once in the entire set of documents, and so is discarded for having too low an occurrence. Such words may be defined as those having a frequency of occurrence which is lower than two standard deviations less than the mean frequency of occurrence, or which is higher than two standard deviations above the mean frequency of occurrence.

A feature vector is then generated at a step 130.

Figure 3A:
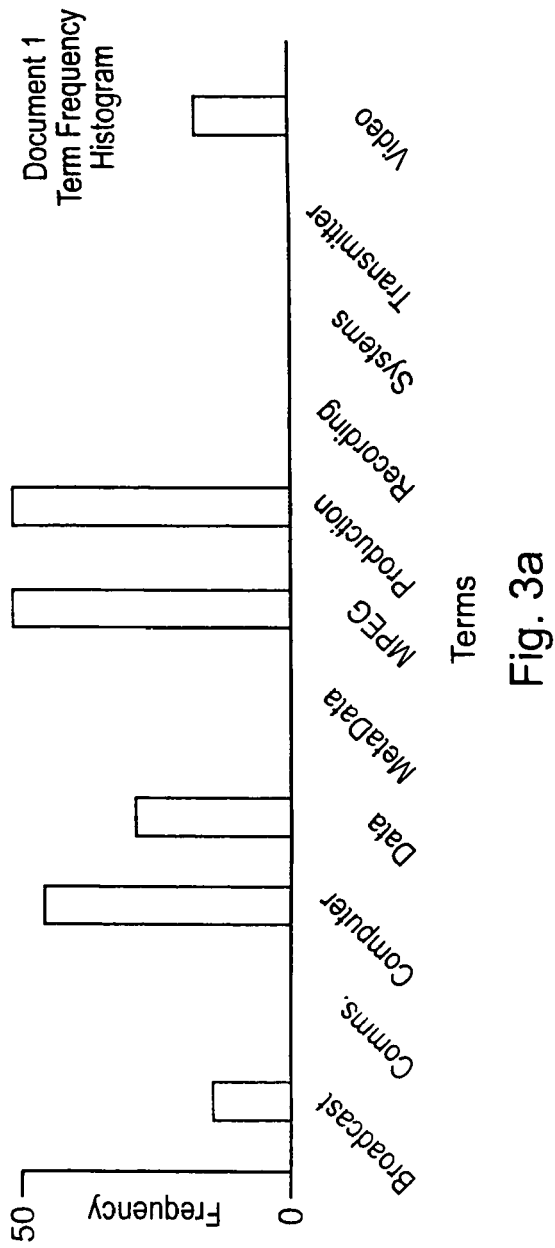
FIGS. 3a and 3b schematically illustrate term frequency histograms.
Figure 3B:
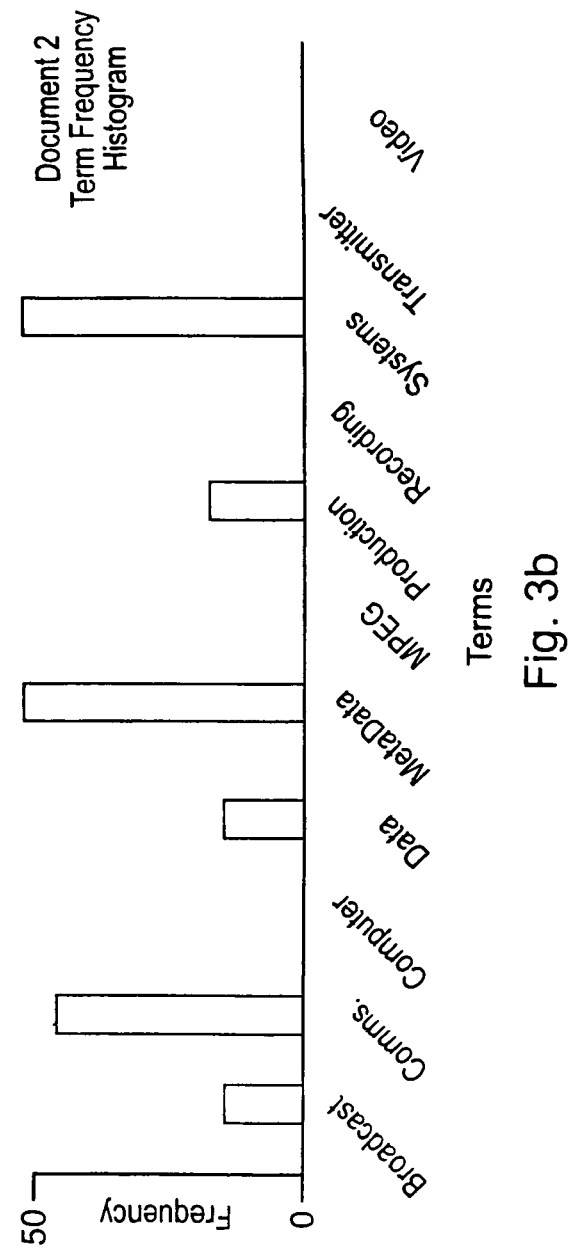

To do this, a term frequency histogram is generated for each document in the set. A term frequency histogram is constructed by counting the number of times words present in the dictionary (pertaining to that document set) occur within an individual document. The majority of the terms in the dictionary-will not be present in a single document, and so these terms will have a frequency of zero. Schematic examples of term frequency histograms for two different documents are shown in FIGS. 3a and 3b.

It can be seen from this example how the histograms characterise the content of the documents. By inspecting the examples it is seen that document 1 has more occurrences of the terms "MPEG" and "Video" than document 2, which itself has more occurrences of the term "MetaData". Many of the entries in the histogram are zero as the corresponding words are not present in the document.

In a real example, the actual term frequency histograms have a very much larger number of terms in them than the example. Typically a histogram may plot the frequency of over 50000 different terms, giving the histogram a dimension of over 50000. The dimension of this histogram needs to be reduced considerably if it is to be of use in building an SOM information space.

Each entry in the term frequency histogram is used as a corresponding value in a feature vector representing that document. The result of this process is a (50000×1) vector containing the frequency of all terms specified by the dictionary for each document in the document collection. The vector may be referred to as "sparse" since most of the values will typically be zero, with most of the others typically being a very low number such as 1.

The size of the feature vector, and so the dimension of the term frequency histogram, is reduced at a step 140. Two methods are proposed for the process of reducing the dimension of the histogram.

i) Random Mapping—a technique by which the histogram is multiplied by a matrix of random numbers. This is a computationally cheap process.

ii) Latent Semantic Indexing—a technique whereby the dimension of the histogram is reduced by looking for groups of terms that have a high probability of occurring simultaneously in documents. These groups of words can then be reduced to a single parameter. This is a computationally expensive process.

The method selected for reducing the dimension of the term frequency histogram in the present embodiment is "random mapping", as explained in detail in the Kaski paper referred to above. Random mapping succeeds in reducing the dimension of the histogram by multiplying it by a matrix of random numbers.

As mentioned above, the "raw" feature vector (shown schematically in FIG. 4*a*) is typically a sparse vector with a size in the region of 50000 values. This can be reduced to size of about 200 (see schematic FIG. 4*b*) and still preserve the relative orthogonal characteristics of the feature vector, that is to say, its relationship such as relative angle (vector dot product) with other similarly processed feature vectors. This works because although the number of orthogonal vectors of a particular dimension is limited, the number of nearly orthogonal vectors is very much larger.

In fact as the dimension of the vector increases any given set of randomly generated vectors are nearly orthogonal to each other. This property means that the relative direction of vectors multiplied by this a matrix of random numbers will be preserved. This can be demonstrated by showing the similarity of vectors before and after random mapping by looking at their dot product.

It can be shown experimentally that by reducing a sparse vector from 50000 values to 200 values preserves their relative similarities. However, this mapping is not perfect, but suffices for the purposes of characterising the content of a document in a compact way.

Once feature vectors have been generated for the document collection, thus defining the collection's information space, they are projected into a two-dimensional SOM at a step 150 to create a semantic map. The following section explains the process of mapping to 2-D by clustering the feature vectors using a Kohonen self-organising map. Reference is also made to FIG. 5.

A Kohonen Self-Organising map is used to cluster and organise the feature vectors that have been generated for each of the documents.

A self-organising map consists of input nodes 170 and output nodes 180 in a two-dimensional array or grid of nodes illustrated as a two-dimensional plane 185. There are as many input nodes as there are values in the feature vectors being used to train the map. Each of the output nodes on the map is connected to the input nodes by weighted connections 190 (one weight per connection).

Initially each of these weights is set to a random value, and then, through an iterative process, the weights are "trained". The map is trained by presenting each feature vector to the input nodes of the map. The "closest" output node is calculated by computing the Euclidean distance between the input vector and weights associated with each of the output nodes.

The closest node, identified by the smallest Euclidean distance between the input vector and the weights associated with that node is designated the "winner" and the weights of this node are trained by slightly changing the values of the weights so that they move "closer" to the input vector. In addition to the winning node, the nodes in the neighbourhood of the winning node are also trained, and moved slightly closer to the input vector.

It is this process of training not just the weights of a single node, but the weights of a region of nodes on the map, that allow the map, once trained, to preserve much of the topology of the input space in the 2-D map of nodes.

Once the map is trained, each of the documents can be presented to the map to see which of the output nodes is closest to the input feature vector for that document. It is unlikely that the weights will be identical to the feature vector, and the Euclidean distance between a feature vector and its nearest node on the map is known as its "quantisation error".

By presenting the feature vector for each document to the map to see where it lies yields an x, y map position for each document. These x, y positions when put in a look up table along with a document ID can be used to visualise the relationship between documents.

Finally, a dither component is added at a step 160, which will be described with reference to FIG. 6 below.

A potential problem with the process described above is that two identical, or substantially identical, information items may be mapped to the same node in the array of nodes of the SOM. This does not cause a difficulty in the handling of the data, but does not help with the visualisation of the data on display screen (to be described below). In particular, when the data is visualised on a display screen, it has been recognised that it would be useful for multiple very similar items to be distinguishable over a single item at a particular node. Therefore, a "dither" component is added to the node position to which each information item is mapped. The dither component is a random addition of ±½ of the node separation. So, referring to FIG. 6, an information item for which the mapping process selects an output node 200 has a dither component added so that it in fact may be mapped to any map position around a node 200 within the area 210 bounded by dotted lines on FIG. 6.

Figure 6:
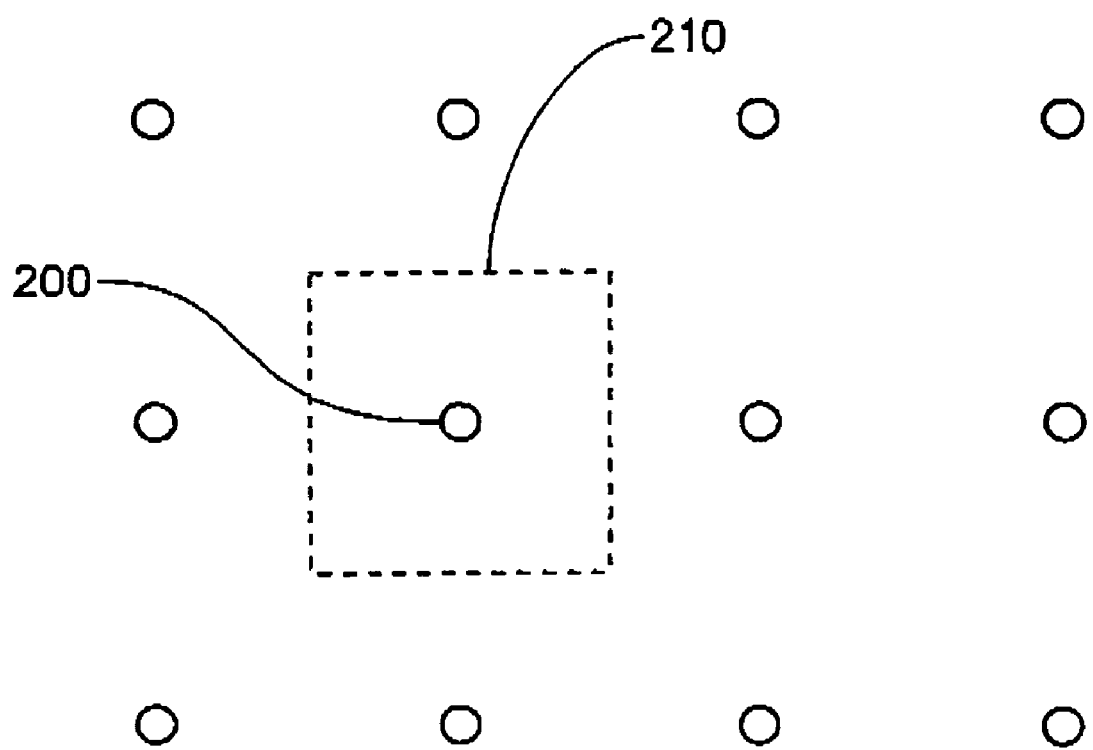
FIG. 6 schematically illustrates a dither process.

So, the information items can be considered to map to positions on the plane of FIG. 6 at node positions other than the "output nodes" of the SOM process.

At any time, a new information item can be added to the SOM by following the steps outlined above (i.e. steps 110 to 140) and then applying the resulting reduced feature vector to the "pre-trained" SOM models, that is to say, the set of SOM models which resulted from the self-organising preparation of the map. So, for the newly added information item, the map is not generally "retrained"; instead steps 150 and 160 are used with all of the SOM models not being amended. To retrain the SOM every time a new information item is to be added is computationally expensive and is also somewhat unfriendly to the user, who might grow used to the relative positions of commonly accessed information items in the map.

However, there may well come a point at which a retraining process is appropriate. For example, if new terms (perhaps new items of news, or a new technical field) have entered into the dictionary since the SOM was first generated, they may not map particularly well to the existing set of output nodes. This can be detected as an increase in a so-called "quantisation error" detected during the mapping of newly received information item to the existing SOM. In the present embodiments, the quantisation error is compared to a threshold error amount. If it is greater than the threshold amount then either (a) the SOM is automatically retrained, using all of its original information items and any items added since its creation; or (b) the user is prompted to initiate a retraining process at a convenient time. The retraining process uses the feature vectors of all of the relevant information items and reapplies the steps 150 and 160 in full.

Figure 7:
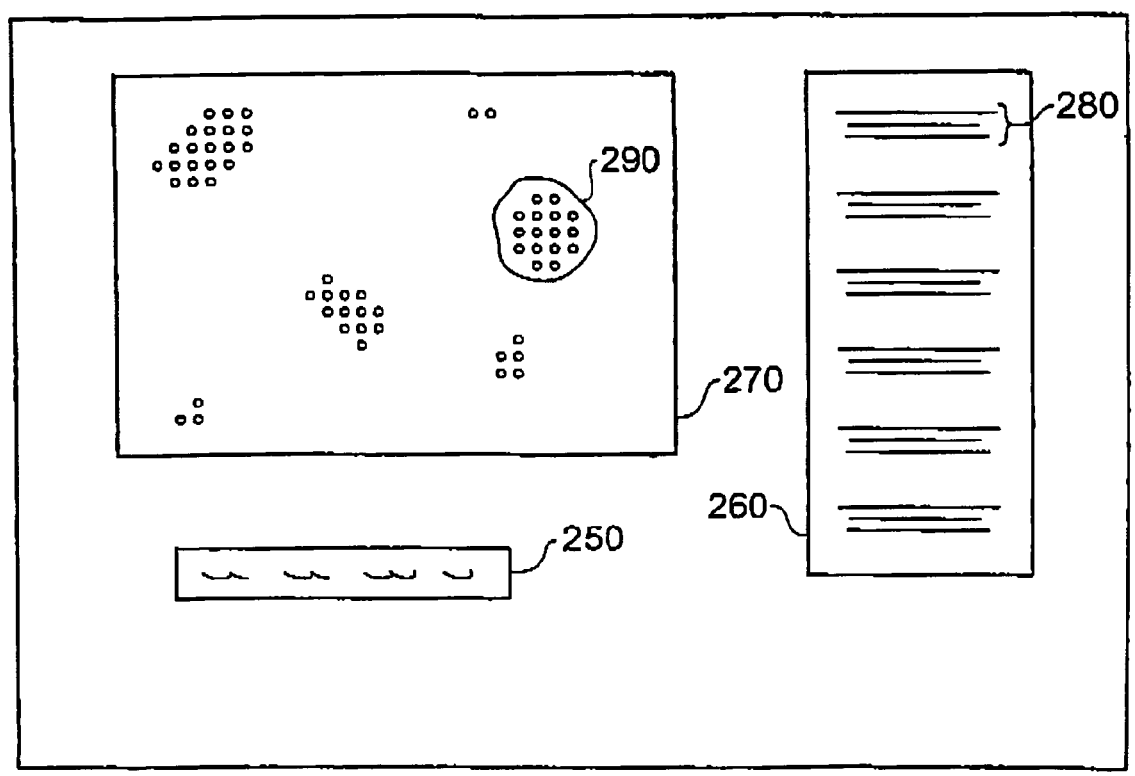
FIGS. 7 to 9 schematically illustrate display screens providing a user interface to access information represented by the SOM.

FIG. 7 schematically illustrates a display on the display screen 60. The display shows a search enquiry 250, a results list 260 and an SOM display area 270.

In operation, initially, the display area 270 is blank. The user types a key word search enquiry into the enquiry area 250. The user then initiates the search, for example by pressing enter on the keyboard 70 or by using the mouse 80 to select a screen "button" to start the search. The key words in the search enquiry area 250 are then compared with the information items in the database using a standard keyword search technique. This generates a list of results, each of which is shown as a respective entry 280 in the list area 260. Then the display area 270 displays display points corresponding to each of the result items.

Because the sorting process used to generate the SOM representation tends to group mutually similar information items together in the SOM, the results for the search enquiry generally tend to fall in clusters such as a cluster 290. Here, it is noted that each point on the area 270 corresponds to the respective entry in the SOM associated with one of the results in the result list 260; and the positions at which the points are displayed within the area 270 correspond to the array positions of those nodes within the node array.

Figure 8:
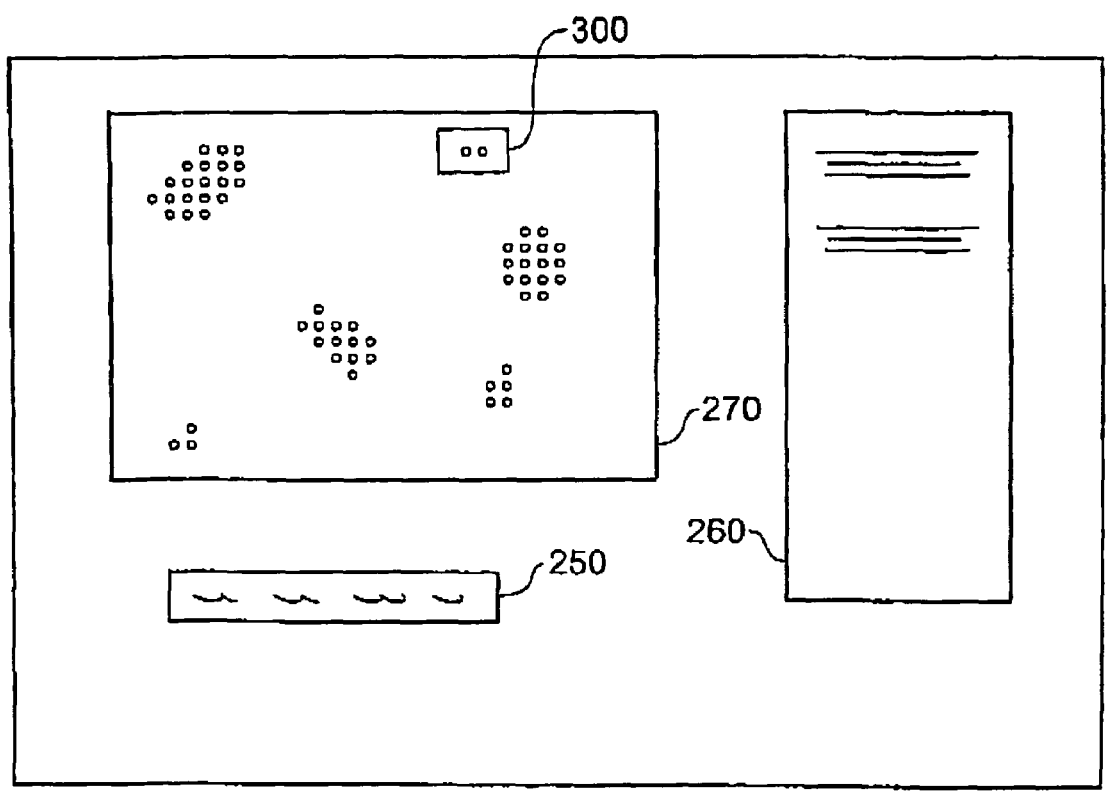

FIG. 8 schematically illustrates a technique for reducing the number of "hits" (results in the result list). The user makes use of the mouse 80 to draw a boundary, which in this example is a rectangular box, 300 around a set of the display points displayed in area 270. In the results list area 260, only those results corresponding to points within the boundary 300 are displayed. If these results turn out not to be of interest, the user may draw another boundary encompassing a different set of display points.

It is noted that the results area 260 displays list entries for those results for which display points are displayed within the boundary 300 and which satisfied the search criteria in the word search area 250. The boundary 300 may encompass other display positions corresponding to populated nodes in the node array, but if these did not satisfy the search criteria they will not be displayed and so will not form part of the subset of results shown in the list 260.

Figure 9:
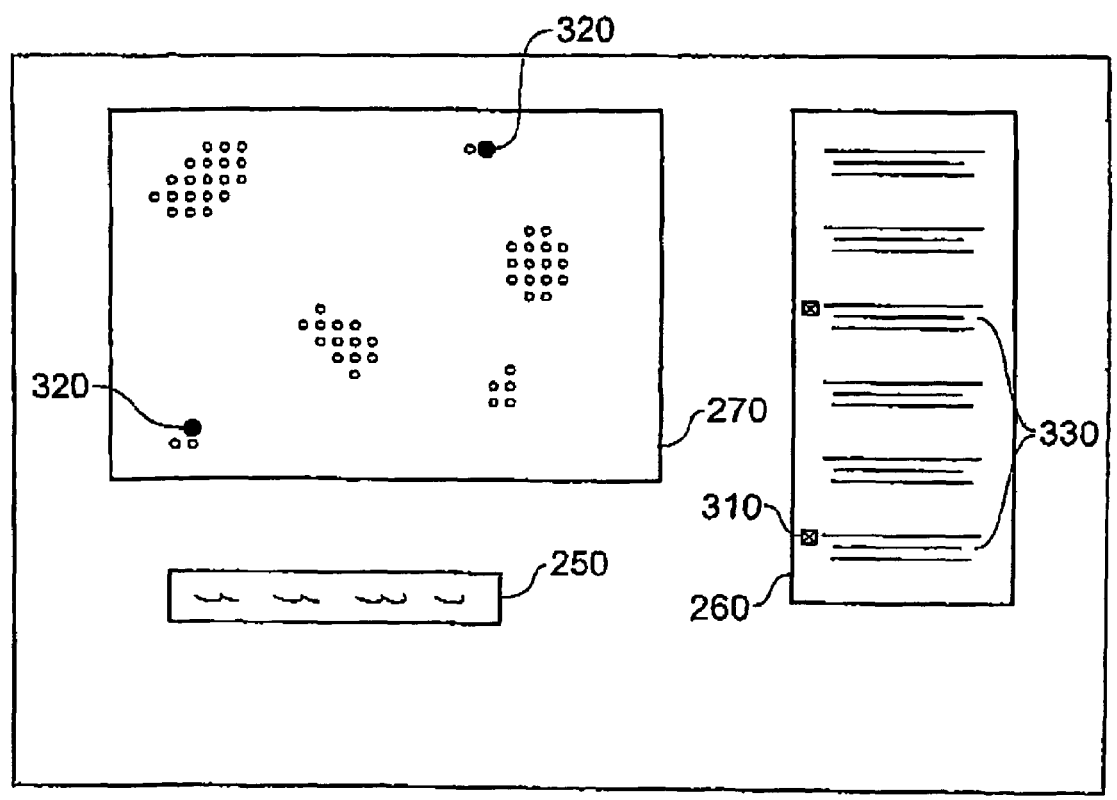

FIG. 9 illustrates an embodiment of the present invention.

Referring to FIG. 9, step 920, when the Self Organising Map SOM is generated it has no labels, (unlike the SOM of Kohonen). Users require labels to give guidance for exploring the map. In embodiments of the invention the labels are automatically generated to match the particular needs of the users. Users generate a list of results of a search as described with reference to FIG. 7 and/or FIG. 8. A label is automatically dynamically generated according to the results and used to label the clusters of display points in the area 270.

Cross-Cluster Association/Assisted Keyword Search

An example embodiment of the present invention will now be described with reference to FIGS. 10, 11 and 12.

Figure 10:
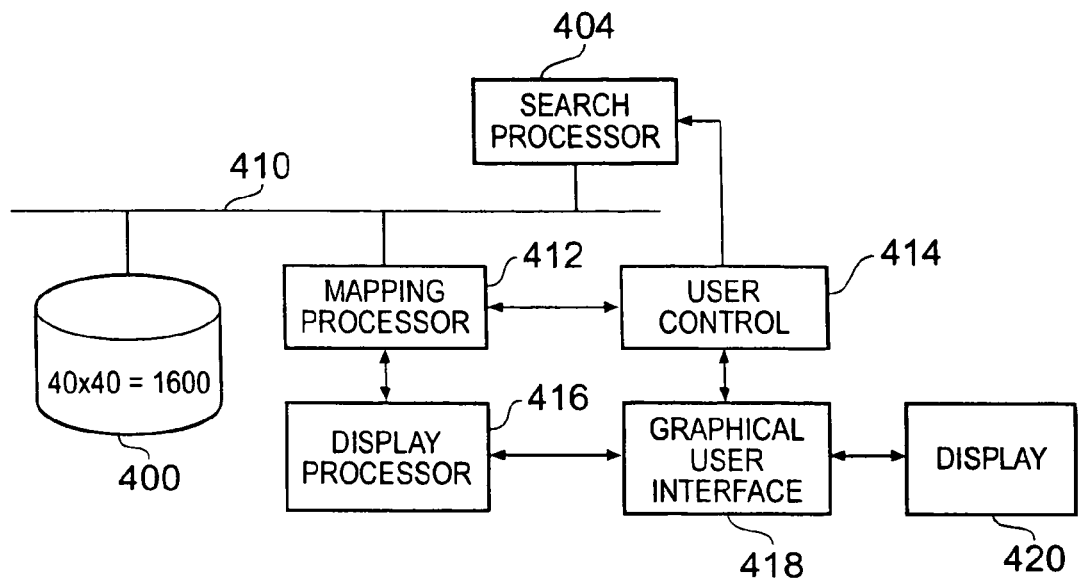
FIG. 10 provides a schematic block diagram of an information retrieval apparatus according to an embodiment of the invention.

In FIG. 10 a data repository 400 containing a database of information items is connected by a data communications network 410 to a search processor 404 and to a mapping processor 412. The mapping processor is connected to a user control 414 and to a display processor 416. An output of the display processor 416 is received by a graphical user interface 418, which interfaces to a display 420. The display processor 416 is operable to process data from the mapping processor for display on the display screen.

The data repository 400 may be separately located to the mapping processor 412. Correspondingly the search processor may be separately located from the data repository 400, mapping processor 412 and those parts shown in FIG. 10, which are utilised for displaying information, which are the display processor 416, the graphical user interface 418 and the display 420. Alternatively the mapping processor 412, the search processor 404 and the display processor 416 may be implemented in a form of software modules for execution on a general purpose computer such as that shown in FIG. 1. However it will be appreciated that the mapping processor, the search processor and the display processor may be produced and located separately.

The embodiment shown in FIG. 10 operates substantially as the storage and retrieval data processor as illustrated in FIG. 1 in combination with the illustrations in FIGS. 7, 8 and 9. FIGS. 7, 8 and 9 provide example illustrations of how information items are searched with respect to a search query and how the results of the search are displayed. Correspondingly, the embodiment shown in FIG. 10 is arranged to receive a search query, for example a keyword from the user control 414. In response to the keyword the search is conducted by the search processor 404 to identify in combination with the mapping processor a set of x, y positions in the array corresponding to information items identified as a result of the search. For example, for a 40×40 array of nodes there are 1600 positions in a square two-dimensional array. As explained above the search processor searches the information items in accordance with a search query. The search by the search processor results in a set of x, y positions for information items identified by the search processor as corresponding to the search query. The x, y positions of the results of the search are received by the mapping processor 412.

In one embodiment, the search processor 404 may be arranged to search the information items and to generate search results, which identify information items, which correspond to a search query. The mapping processor 412 may then receive data representing the results of the search identifying information items corresponding to the search query. The mapping processor then generates the x, y co-ordinates of the positions in the array corresponding to the identified information items.

The mapping processor 412 is operable to identify clusters of information items at a first global level by conducting a k-means clustering process. The k-means clustering process identifies the clusters and position of the clusters within the array. The k-means clustering process is disclosed in book entitled "Neural Networks for Pattern Recognition," by Christopher M. Bishop, pp 187-188, Oxford University Press. A further disclosure of the k-means clustering algorithm is disclosed in the web address:

http://cne.gmu.edu/modules/dau/stat/clustgalgs/clust5_bdy.html

Figure 11:
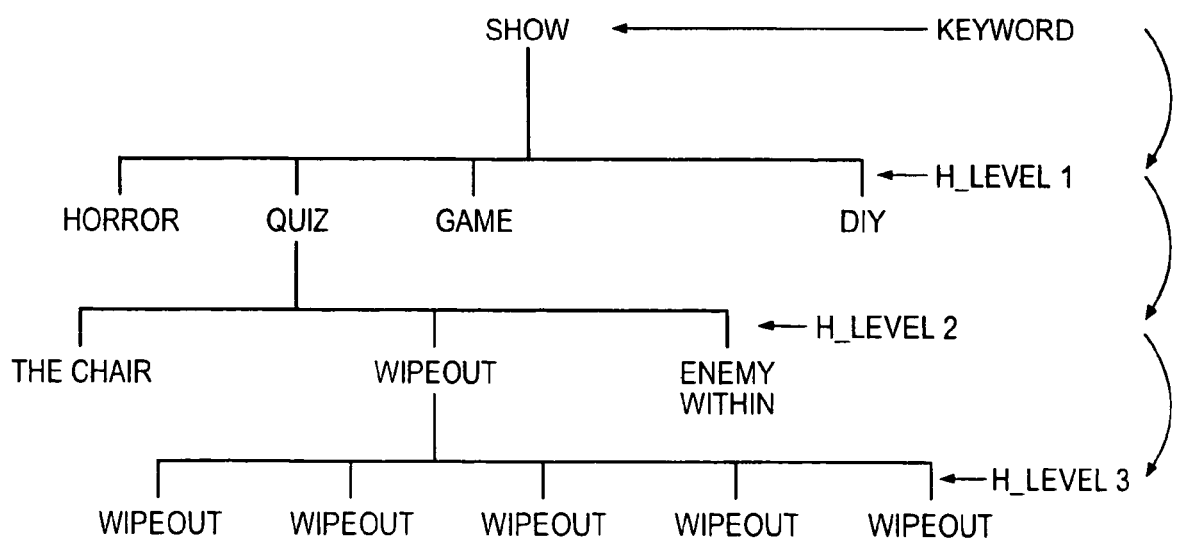
FIG. 11 provides an illustrative representation of a hierarchical arrangement of information items identified in a search.
Figure 12:
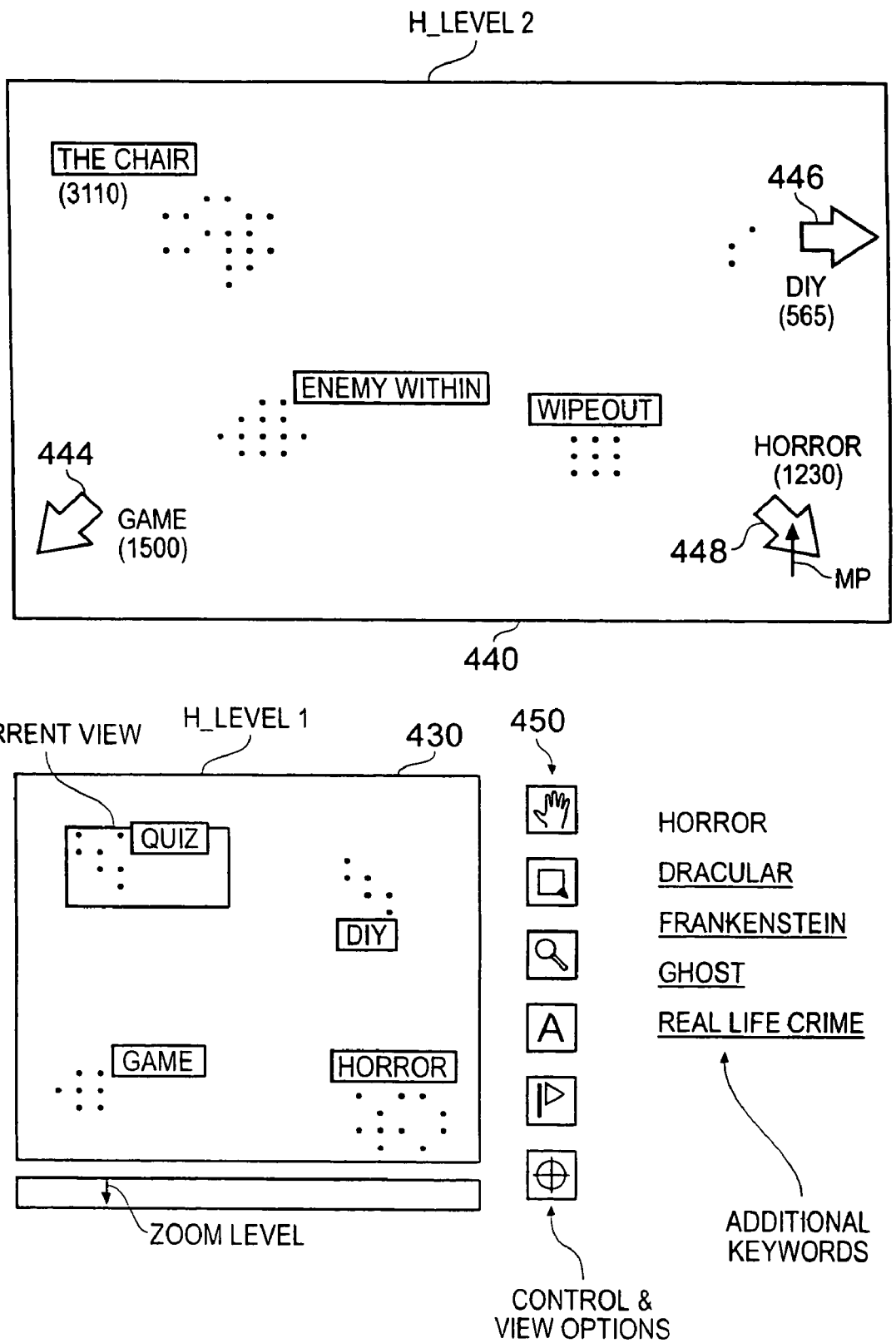
FIG. 12 provides a schematic representation of a screen providing two areas for displaying different levels of the hierarchy shown in FIG. 11.

As illustrated in FIG. 11 the results of the search on the keyword "show" might identify positions in the array corresponding to information items which have the word "show" as part of their metadata. Therefore, the result of performing the k-means clustering algorithm on the array identifies for example three clusters of information items which are "quiz", "game" and "DIY". These clusters of information items form a first hierarchical level h_level1. The display processor 416 receives data from the mapping processor 412 corresponding to the clustering of information items at the first hierarchical level h_level1. The display processor 416 processes the first hierarchical level of data so as to provide data representing a two-dimensional display of this first hierarchical h_level1. The data generated by the display processor 416 is fed to a graphical user interface 418 for display in a first area 430 on the display screen 420 as shown in FIG. 12.

In some embodiments a further operation may be performed by the mapping processor 412 to refine the identification of clusters using the k-means algorithm. The further operation is known as "k-means clustering and pruning". The known k-means clustering process identifies groups of array positions for information items identified in the search results which denote similar information items. A further pruning process of determining whether adjacent sub-clusters of x, y positions of result items are part of the same main cluster is then performed. If a distance between the centres of two sub-clusters is less than a threshold value, then the two sub-clusters are deemed to be part of the same main cluster. The pruning is performed iteratively in known manner until the clustering is stable.

The mapping processor 412 operates to perform a further analysis of each of the clusters of information items identified at the first hierarchical level h_level1. In order to provide a user with a facility for examining the clusters of information items individually and identifying further clusters within those information items the mapping processor 412 forms a further hierarchical level. Accordingly, for each cluster of information items the k-means clustering algorithm is performed for that cluster to identify further clusters within that first hierarchical level of information items. So for example, as illustrated in FIG. 11 if the k-means algorithm is performed on the "quiz" cluster then three further clusters are identified at a second hierarchical level h_level2.

As illustrated for the first hierarchical level each cluster is labelled in accordance with a keyword. The keyword is identified by finding the most common word which each of the information items within the cluster have present in the metadata associated with that information item. So for example in the first hierarchical level three clusters are identified by the words "quiz", "game" and "DIY".

In a corresponding manner to the labelling of the clusters of the first hierarchical level h_level1 a keyword is identified for each of the clusters in the second hierarchical level h_level2. Accordingly, the three clusters are labelled "the chair", "wipeout" and "enemy within". Each of these three clusters comprises different episodes of a quiz show.

As will be appreciated a further iteration of the analysis of each cluster can be performed. This is achieved by performing the k-means algorithm on each of the clusters identified at the second hierarchical level h_level2. As illustrated in FIG. 11 the "wipeout" information cluster is further analysed using the k-means clustering algorithm. However, at the third hierarchical level h_level3 only individual information items are revealed and so as illustrated in FIG. 11 the third hierarchical level h_level3 identifies individual episodes of "wipeout".

The mapping processor 412 is therefore operable to identify clusters of information items at different hierarchical levels. Data representing each of the hierarchical levels is fed to the display processor 416. Accordingly, in combination with the graphical user interface 418 a second area may be displayed on the display 420 which may for example correspond to the second hierarchical level h_level2. Thus, using the zoom control a user may zoom into the clusters displayed in the first hierarchical level h_level1. The zoom control may be operated using the user control 414. Accordingly, zooming into a particular cluster can have an effect of revealing the second hierarchical level of information items h_level2. Alternatively, the user control 414 may be used to select a "current view" area within the first area. Accordingly, the second display is illustrated with respect to the clusters identified within the "quiz" cluster identified at the first hierarchical level shown in the first display h_level1.

A further advantage provided by embodiments of the present invention is an arrangement in which the second or a subsequent level, which is displayed in a second or subsequent area of the display, may be provided with indicators of other clusters. The indicators direct the user to alternative clusters to the keyword associated with the cluster being viewed at a lower hierarchical level. Thus the clusters which are being illustrated at a lower hierarchical level within the second display area 440, will have alternative clusters to the cluster being viewed. For example, in FIG. 12 in the first display area 430 the first hierarchical level illustrates the three clusters of "quiz", "game" and "DIY". Since the zoom control is used to zoom in at the "quiz" cluster, then the second display area 440 provides a display of the clusters within the "quiz" cluster which are "the chair", "enemy within" and "wipeout". However, alternative keywords to the "quiz" cluster are "DIY", "horror" and "game" as illustrated in the first area. Accordingly, arrows 444, 446 and 448 are provided to direct the user to clusters of information items which are at the same hierarchical level as the "quiz" cluster being displayed in the second display area. Accordingly, if the user wishes then to review a different cluster from the first hierarchical level to reveal the clusters in the second hierarchical level, then the user can use the arrows to navigate to the alternative clusters within the first hierarchical level. Furthermore, advantageously the arrows are labelled with the keyword label for the cluster, which appears in the first hierarchical level. In other embodiments, in order to provide the user with an illustration of the relative number of items in the cluster then this number is shown alongside the keyword associated with the direction-indicating arrow. The user control and the display may be arranged to indicate this number when the mouse pointer MP passes or is positioned over the indicating arrow.

A further advantageous feature of some embodiments is to provide a list of additional keywords, that is to say the keywords associated with second level clusters within first level clusters. As illustrated in FIG. 12 for a clustering providing the further first level cluster of "horror" then the additional words corresponding to the clusters at the second level within that first level cluster "horror" are generated when a mouse pointer MP is positioned over the arrow associated with "horror". As a result the user is provided with a very efficient illustration of the content of the information items associated with the first level clusters without having to view those clusters within the second display area 440. As illustrated in FIG. 12 the display area may further include control icons shown generally as 450 which are used to both review and navigate around the information items appearing in the first display area 430.

Multi-modal Refined Search

Figure 13:
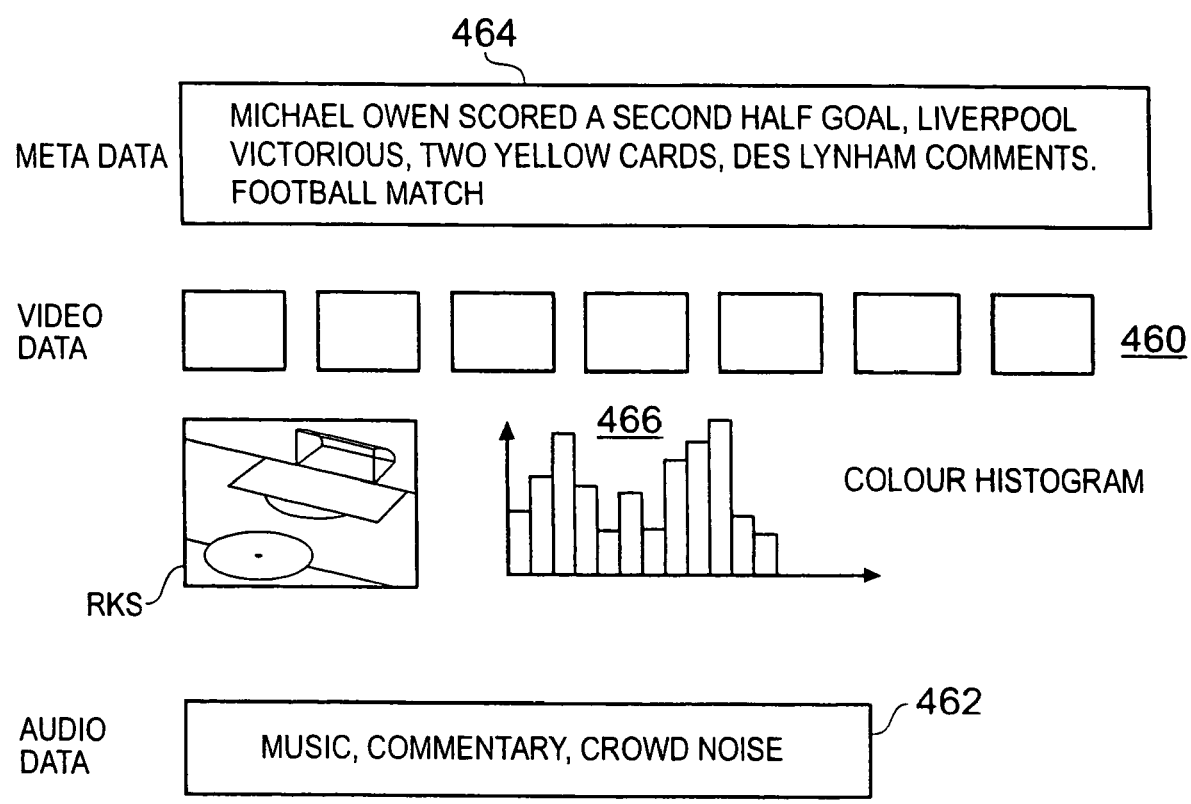
FIG. 13 provides an illustrative representation of three types of characterising information features for an example information item.

Another example embodiment of the present invention will now be described with reference to FIGS. 10 in combination with FIGS. 13 to 17. FIG. 13 provides an illustrative representation of the type of characterising information features, which are stored in association with an information item. For example, the information item may be a section of audio/video data from a television programme. In the current example the programme provides highlights of a football match. Accordingly, the data item includes video data 460 and audio data. Associated with the audio data is audio metadata illustrated within a box 462. The audio metadata describes the content and the type of audio signals associated with the video data. For the present example the audio data includes "music", "commentary", "crowd noise" but may include one or more other types of metadata indicating the type of audio signals. In addition to the video data and audio data the information items may also include other metadata which describe the contents or attributes of the video and audio data. For the present example metadata is illustrated within a box 464 and is shown to include a description of the content of the video programme. It is the words contained in this metadata which are used to build a feature vector from which the SOM is generated. However, in other embodiments of the invention the set of information items contained in the data repository 400 may be searched with respect to the audio data that is the audio metadata 462 or on the video data. To this end a representative key stamp may be generated from the frames of video data 460.

The representative key stamp RKS is generated by forming a colour histogram of each of the frames of video data. The colour histogram for all or selected video frames are combined and then normalised to produce a composite colour histogram, which is illustrated in representative form as a bar graph 466 in FIG. 13. The composite colour histogram is then compared with the colour histogram for each of the video frames. A distance is determined between the colour histogram for each frame and the composite colour histogram by summing a distance of each of the columns of the colour histogram for each video frame with the corresponding columns of the composite histogram. The representative key stamp RKS having a colour histogram which has the smallest distance with respect to the composite colour histogram is selected. For the programme describing a football match, then correspondingly the representative key stamp produced would be most likely to be a video image of a part of a football pitch, which is illustrated by the representative key stamp RKS shown in FIG. 13.

In other embodiments an RKS may be generated for each information item from the video frames, by any of the following methods:

A user may select the frame, which is considered to be the most representative frame corresponding to the overall content of the information item. This method may provide improved reliability, since the user ensures that the video frame is selected which subjectively represents an information item. However this is more time consuming.

A user may select the first frame or a random frame within an information item. This may be a less reliable method for selecting an appropriate RKS.

Other methods for processing the video frames and selecting an RKS based on the content of the image frames are envisaged.

Embodiments of the present invention can provide a facility for producing a refined search based upon selected characterising information features. In one embodiment the search processor 142 is operable to search those information items which were identified in a first search in accordance with either an item of metadata, a video image or audio data. In alternative embodiments the search may be conducted just on metadata or just video data or only audio data or any combination thereof. To facilitate the formation of a search query, the display device 420 shown in FIG. 10 may include a further graphical display provided by the graphical user interface 418 which is illustrated in FIG. 14.

Figure 14:
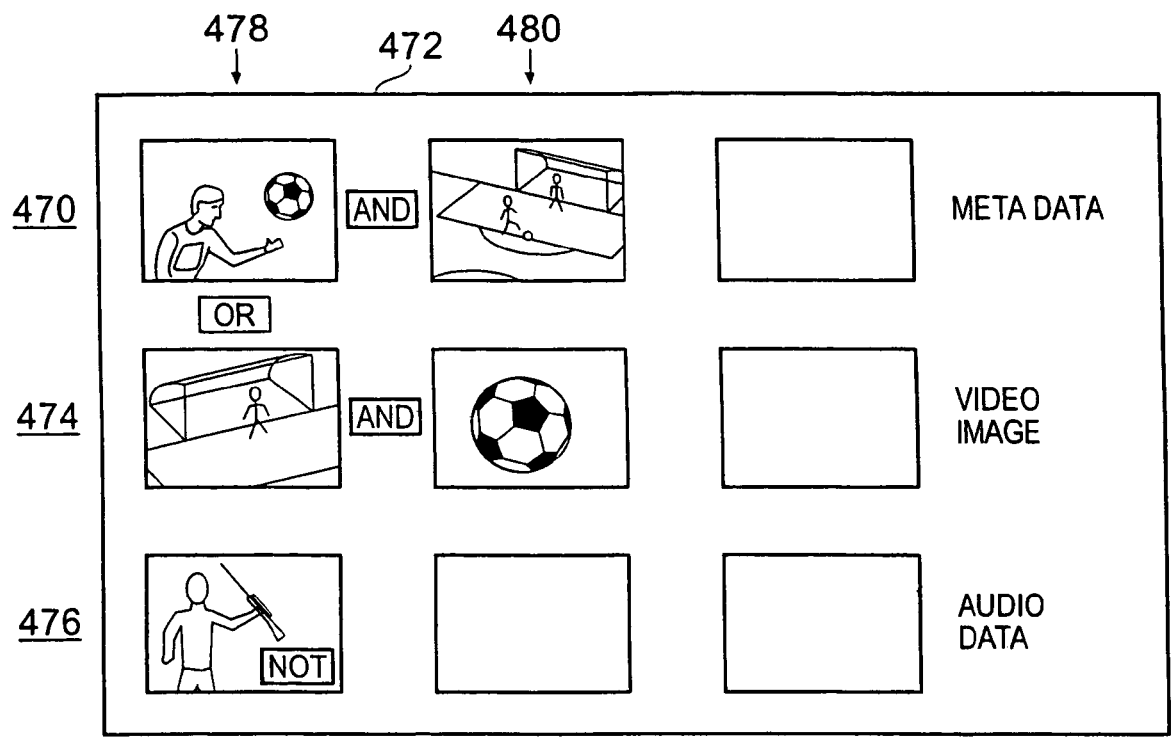
FIG. 14 provides a schematic illustration of a graphical user interface for forming a search query according to an example embodiment of the invention.

In FIG. 14 a first row 470 within a display area 472 provides a user with a facility for selecting query information based on metadata. Accordingly, if an image representative key stamp from an information item is placed within the window in this row then metadata associated with this information item (as illustrated in FIG. 13) will be added to the search query. Accordingly, one or more representative key stamps from different information items may be introduced into the search query for the characterising information feature of type metadata. Correspondingly, in the second row 474 video frames, which have been selected by the user, are introduced to form part of the search query. For example, a user may browse a particular item of video data and select a frame of interest. The user may then place this image frame in the row 474 to form part of the search query. The user may introduce one or more video frames.

A user may also select an information item to be searched in accordance with the audio data within that information item. Accordingly, the third row within the display area 476 provides a facility for a user to introduce a representative image of that information item to identify within the row for audio data that the search query is to include audio data corresponding to that information item within the search query.

In addition to selecting information items to be searched in accordance with the type of the characterising information features, embodiments of the present invention also provide a facility for searching in accordance with Boolean operators between the selected information items. As illustrated in FIG. 14, the information items which have been selected for a metadata search, are to be searched in accordance with an "AND" operator as shown between the first two columns 478, 480. However, the search query between the first metadata and the first video image items in the search query are connected by an "OR" operator. The two items to be searched for the video image data are connected by an "AND" operator. Also the information item which is to be searched in accordance with audio data is to be searched in the search query in accordance with a "NOT" operator.

Having built the search query, the search processor 404 is operable to search the information items identified from a keyword search in accordance with the search query built from the selection made by the user and illustrated in FIG. 14. The search processor searches the information items differently in dependence upon the type of characterising information features selected as will be explained in the following paragraphs:

For the example of searching for characterising information features such as metadata, then for any information item the feature vector for that information item generated from the metadata can be used to identify a point in the two-dimensional array corresponding to that feature vector. Accordingly, information items within a predetermined distance of that identified position in the array can be returned as a result of the search query. However, if more than one information item has been selected within the metadata search row then a search query must be built in a way which searches both of these items in accordance with the Boolean operator selected.

Figure 15:
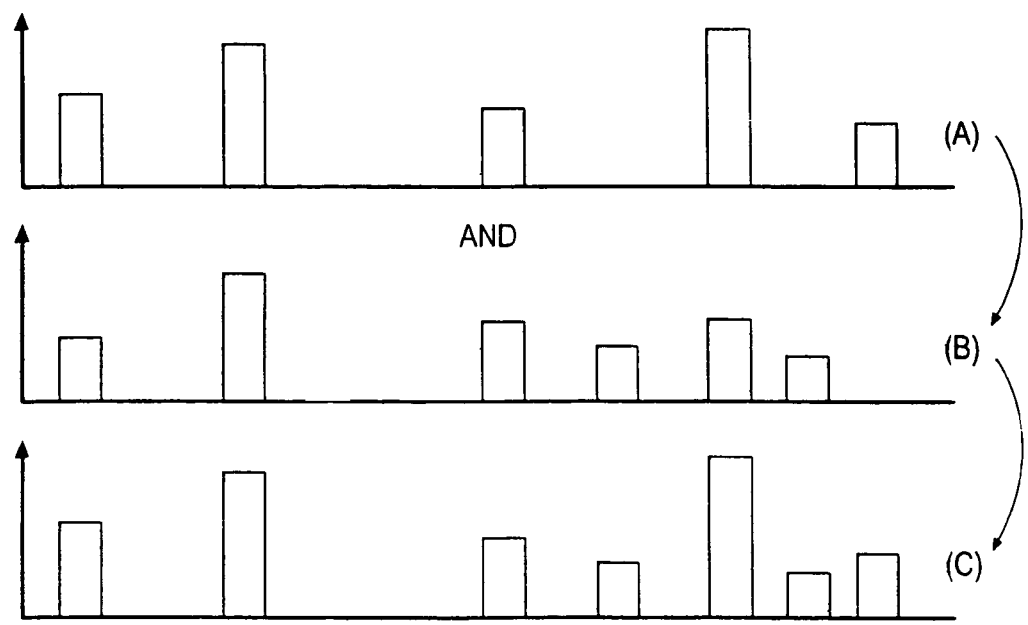
FIG. 15 provides a schematic illustration of the formation of a composite feature vector in accordance with a Boolean AND operation.

For the example of the "AND" Boolean operator then the feature vector for each information item is combined to form a composite feature vector as illustrated in FIG. 15. To this end, the values associated with each of the words within the metadata are added together and normalised to produce the composite feature vector. Thus as illustrated in FIG. 15 the two feature vectors A, B associated with the user selected metadata which have their representative key stamps illustrated in row 470 and columns 478 to 480 and the metadata search query line 470 are combined together to form the feature vector C. The search processor may then take the feature vector C and compare this with the SOM. Having identified the closest position in the array corresponding to the composite feature vector C information items within a predetermined number of positions within the array from that identified position in the array are returned as a result of the search query.

Figure 16:
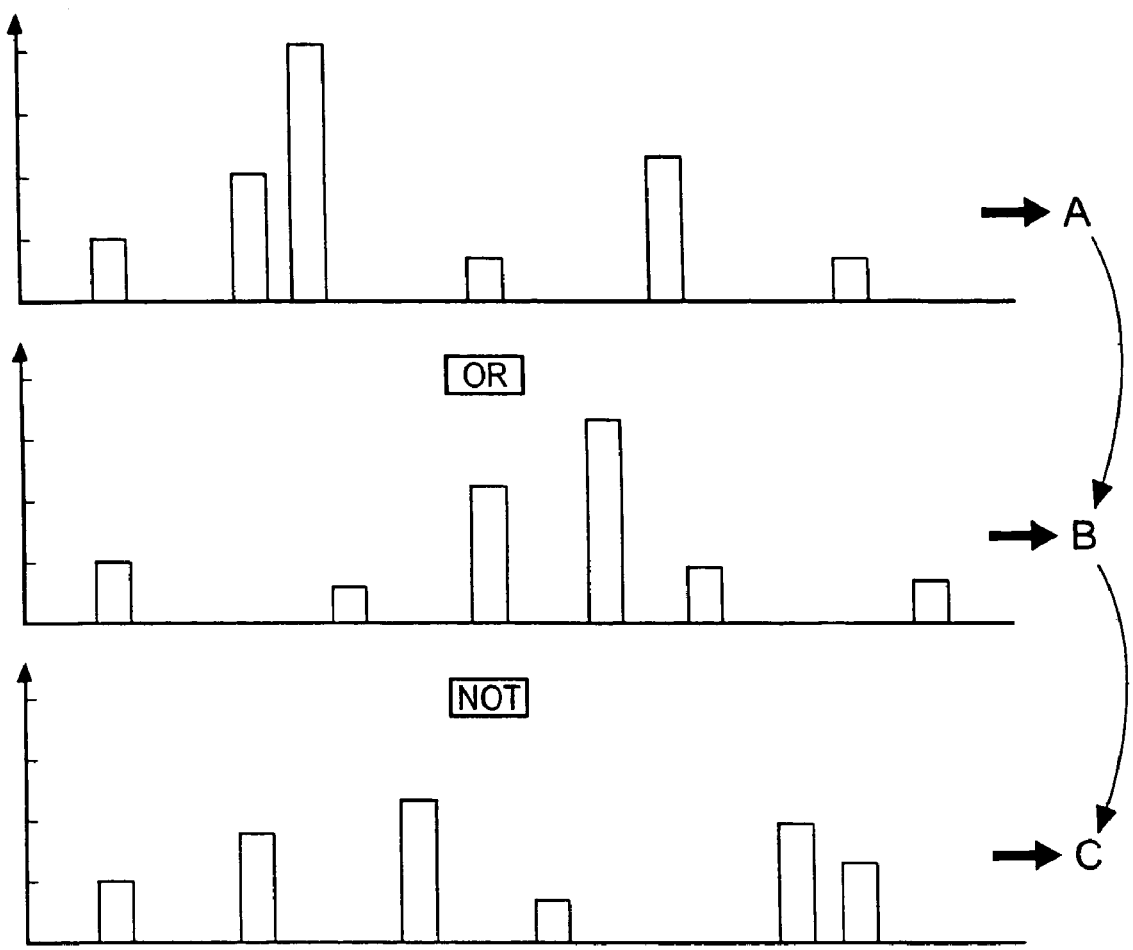
FIG. 16 illustrates a combination of two feature vectors in accordance with a Boolean OR operator and a third feature vector in accordance with a Boolean NOT operator.
Figure 17:
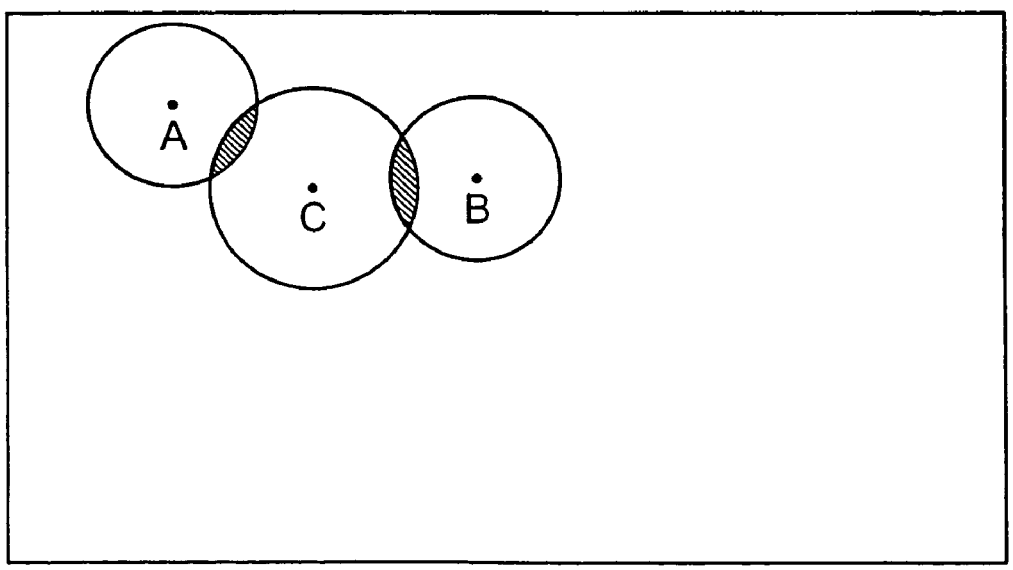
FIG. 17 schematically illustrates a part of the two-dimensional map of identified information items showing the results of a search in accordance with the Boolean operators and feature vectors of FIG. 16.

For the example of the Boolean "OR" operator for a corresponding metadata search then for the first feature vector A and the second feature B the corresponding position in the array for those feature vectors are identified. As such, the result of the search query is to return all the information items within a predetermined number of positions of each of those identified points in the array. This is illustrated in FIGS. 16 and 17. In FIG. 17 positions in the two-dimensional array corresponding to feature vector A and corresponding to feature vector B are identified. As illustrated in FIG. 17 positions in the array within a predetermined radius of the array positions for A and B can then be returned as identified as a result of the search query. However, if a further feature vector C is identified in the search query and a "NOT" Boolean operator is specified for this further feature vector then again the position in the array corresponding to feature vector C is identified. Accordingly, again the information items within the predetermined radius of array positions from C may be identified. However, as a result of the "NOT" operator any mutually inclusive array positions identified between the radius from the array positions for the feature vectors C and A and B are excluded from the results of the search. Accordingly, the search processor is arranged to return the information items corresponding to the positions in the array produced from A or B but not C.

For the second line in the search query corresponding to video image data being the characterising feature of the search, then the search processor is operable to search the video data for representative key stamps corresponding to the selected user video image. To this end, the colour histogram associated with the user selected video image is compared with the colour histogram for each of the representative key stamps associated with the information items. A distance is calculated between the colour histogram of the representative key stamp of each of the information items and the colour histogram of the user specified video image. This is effected by calculating a distance between each of the columns representing the colour components of that image and summing these distances for each column. The array position corresponding to the information item having the least distance between the colour histogram of the user selected video image and that of the representative key stamp corresponding to that array position is identified. Again the results of the query would be to return information items having array positions within a predetermined number of positions from the identified array position.

Figure 18A:
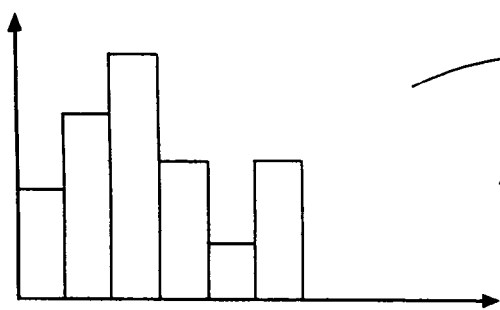
FIG. 18(a) and 18(b) provide illustrative bar graphs providing two examples of colour histograms for two video images forming a search query, and FIG. 18(c) provides an illustrative bar graph produced by combining the colour histograms of FIGS. 18(a) and 18(b)
Figure 18B:
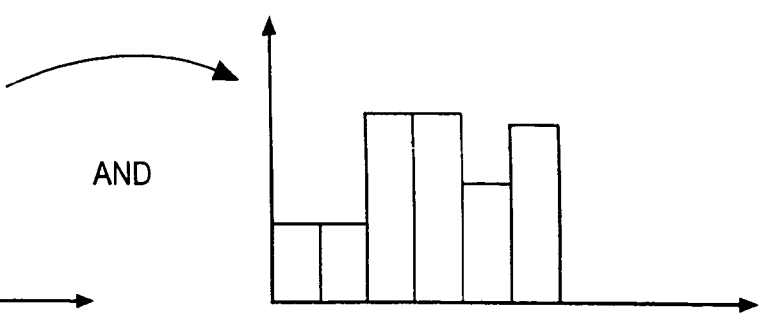
Figure 18C:
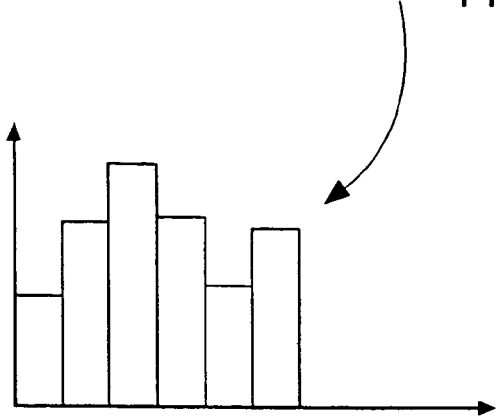

For the case of Boolean operators then again a colour histogram can be formed by combining the colour histograms for two images selected and specified for the Boolean "AND" operator. The process of forming a composite colour histogram is illustrated in FIG. 18. The colour histograms for the first and second user selected images provided in row 474 and the columns 478, 480 of the video image search query tow within the display area illustrated in FIG. 14 are combined by averaging the values in each of the columns of the colour histogram. Thus, the two colour histograms illustrated in FIGS. 18a and 18b are combined to form the colour histogram formed in FIG. 18c. It is this colour histogram which is searched with respect to the representative key stamps of the information items which are to be searched.

For the example of audio data then the search processor may form a feature vector from the audio metadata associated with the selected information item. For example, the audio metadata may identify harmonics present in the audio signal, speech data or whether there is music present within the audio signals represented by the audio metadata. In addition, the metadata may identify whether a particular speaker is present on the audio signal such as Tony Blair or a particular commentator, such as John Motson. Accordingly, again a feature vector may be generated from the selected audio data which may be searched with respect to other feature vectors associated in particular with audio data. In a corresponding way to that explained above, the Boolean operators may be used to combine a search for more than one audio metadata type. For the example of the "AND" operator the audio metadata items may be combined to produce a composite metadata item. Searching for a corresponding information item which has a feature vector which is closest to this composite item will identify an information item. The search processor may then recover information items within a predetermined number of positions within the array for both metadata items when an "OR" operator is specified. Again the "NOT" Boolean operator will serve to exclude information items returned having matching audio data from the results of the search query.

The embodiments of the present invention have been provided for refining a search from identified information items. However it will be appreciated that in other embodiments the search query formed by the display illustrated in FIG. 14 and the application of that search query with respect to metadata, video image data and audio data may be provided to search the entire set of information within the data repository 400.

Related Search

As explained above according to an example embodiment of the invention, information items according to a search query built using the graphical user interface shown in FIG. 14, may be searched by identifying items which neighbour a particular array position identified by the search query. However, in other example embodiments a related search may be made from an information item identified for any reason. Typically however, a search according to a particular keyword will yield a set of identified information items. From these information items the user may determine that one of these is of particular interest. Then a related search may provide items which have some correlation to this information according to the SOM. This is achieved by identifying information items which correspond to array positions within, for example, a predetermined radius from the array position corresponding to the information item of interest.

Figure 19:
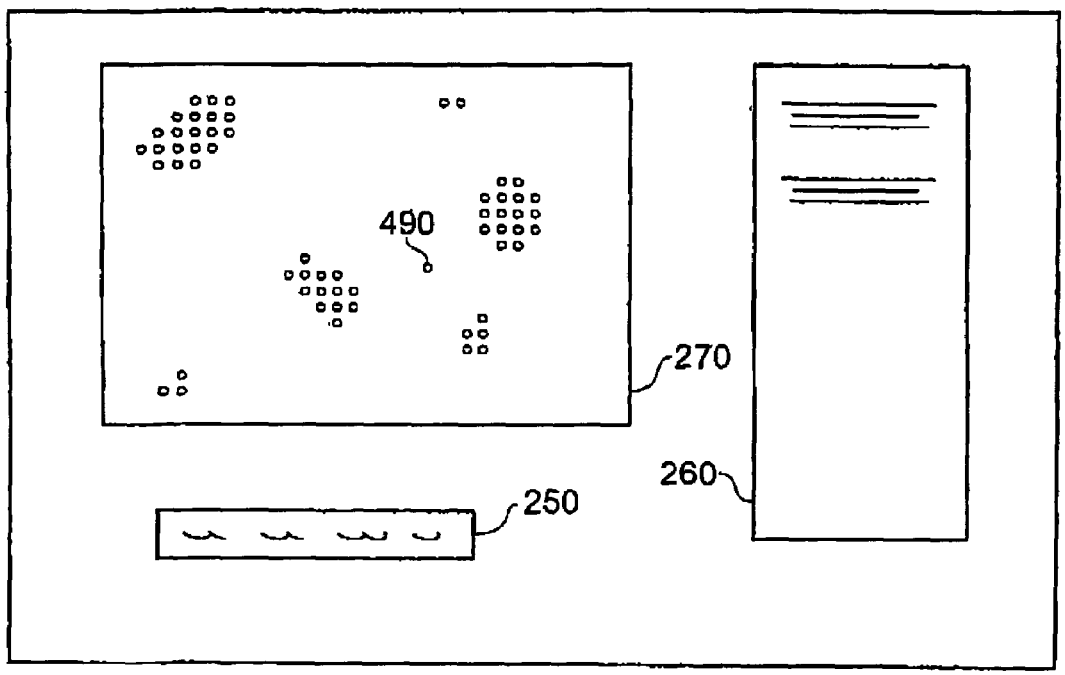
FIG. 19 schematically illustrates a display screen providing a user interface to access information represented by the SOM corresponding to those illustrated in FIGS. 7 to 9.
Figure 20:
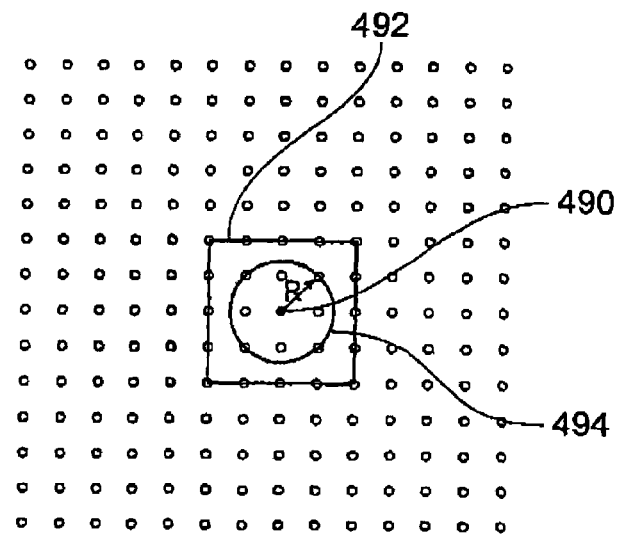
FIG. 20 provides an illustrative representative of an array of positions in two dimensions with respect to which a related search is illustrated.

FIG. 19 provides a schematic illustration of how the search processor 404 may perform a "find related" search. A user may consider that a particular information item is of interest. For example, FIG. 19 reproduces the representation of the graphical user interface shown in FIGS. 7, 8 and 9. Consider that the results of an earlier search reveals the arrangement of identified positions in the array illustrated as before by black dots, and the user has found a particular information item corresponding to a position 490 within the array to be of interest. To effect a related search the user arranges the mouse pointer MP to be positioned over the position of interest 490 and engages a related search through a menu option, which for example may appear automatically. Upon engaging a related search, the search processor 404 identifies information items corresponding to array positions within a predetermined number of neighbouring positions from the position of interest 490. For example, the search processor 404 may identify information items corresponding to array positions within a square box 492, the box being formed from plus and minus two positions in the x and y directions. Alternatively, the search processor 404 may identify information items corresponding to array positions within a circle having a predetermined radius R of one position on the diagonal from the array position 490 of the selected information item of interest.

Having identified the information items corresponding to the related array positions, the characterising information features for each identified information item may be displayed within the display area 260, shown in FIG. 19.

In some embodiments the number of array positions with respect to which related information items may be identified may be altered by the user using the user control in accordance with a relative sensitivity with which the related search is to be carried out. Accordingly, the number of predetermined neighbouring positions identified in the related search may vary. This may be effected by changing the radius R of the circle 494 or the size of the box 492.

Performing a related search based on the array rather than by searching the information items for some characterising information feature, such as a keyword search, provides a facility for searching for information items of interest which can reduce the computational complexity with regard to searching for keywords. The related search operation using the array is facilitated by a property of the SOM, which tends to position information items, which are similar at similar positions within the array. Accordingly, information items which have neighbouring positions within the array to the position corresponding to the information item of interest will be correlated with respect to that information item. Therefore, retrieving information items which correspond to these neighbouring positions will reveal a focussed search for items which are more likely to be consistent with a users search requirements.

Summary Flow Diagram for Related Search

Figure 21:
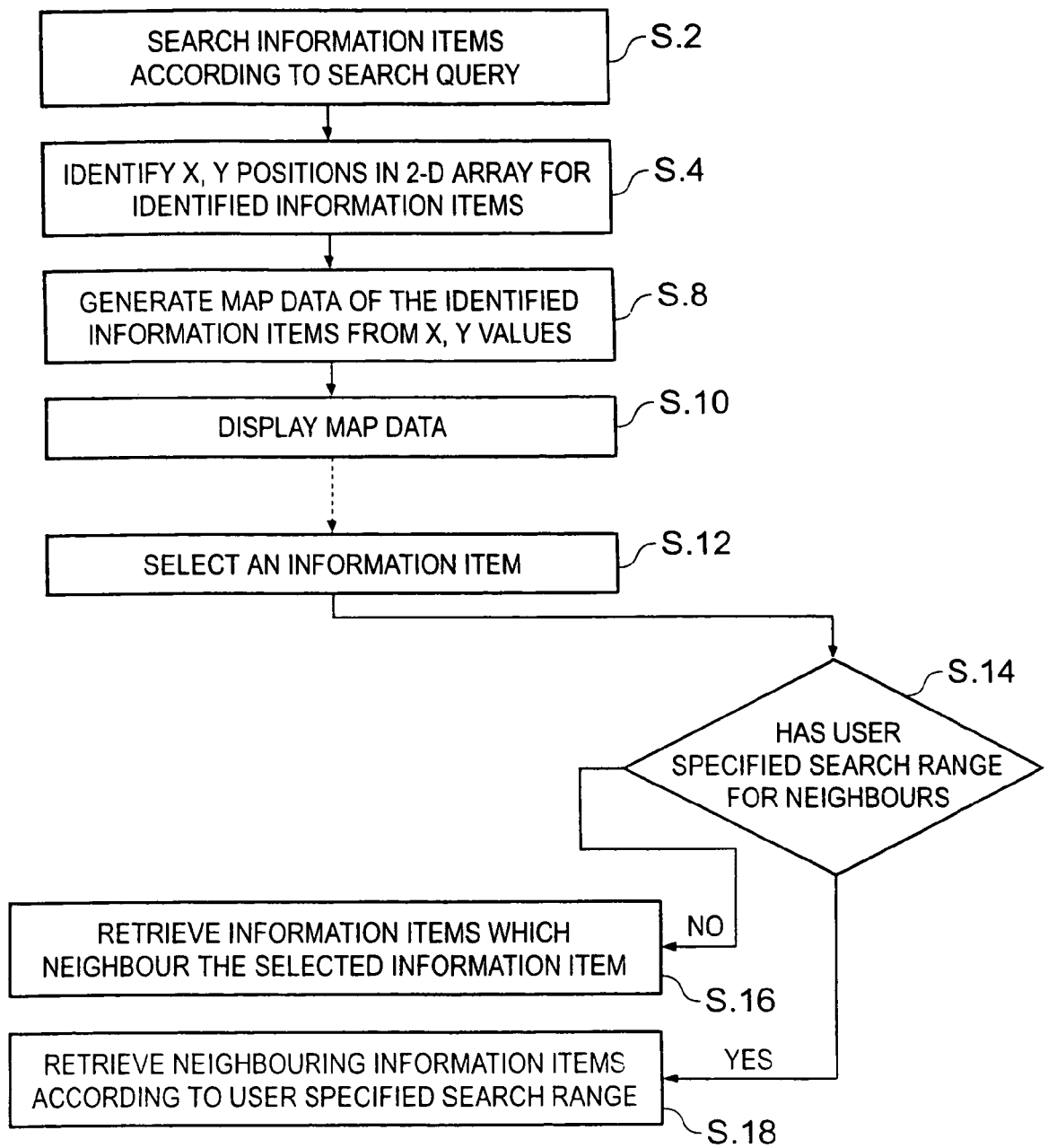
FIG. 21 provides a flow diagram illustrating the operation of the related search performed by the search processor.

A flow diagram summarising the operation of the search processor when performing the related search is shown in FIG. 21. The steps of the related search process are summarised as follows:

S.2: Although the first step in the operation could be generating data representative of a map of information items from a set of information items according to a user specified search query, steps S.2 to S.10 may be omitted if the related search is to be performed from a user identified information item. The map provides the information items with respect to positions in an array in accordance with a mutual similarity of the information items, similar information items mapping to similar positions in the array.

S.4: The information items are mapped onto positions in a 2-D array from the x, y array positions identified in the search or by the mapping processor.

S.8: Map data is generated from the x, y positions of array positions within the array for display.

S.10: A representation of at least some of the information items is display as the 2-D array according to the map data.

S.12: A user selects an information item, which is of interest.

S.14: A user may have specified the conditions by which a related search is to be performed. The user may have identified the number of neighbours or a radius from the array position of the information item of interest.

S.16: If the user has not specified a particular requirement for the related search, the search processor automatically identifies a number of predetermined neighbouring positions and returns information items corresponding to these positions.

S.18: If the user has specified a particular requirement for the related search, the search processor identifies neighbouring positions according to the user specification and returns information items corresponding to these positions.

Various modifications may be made to the embodiments described above without departing from the scope of the present invention. Various aspects and features of the present invention are defined in the appended claims.

the invention claimed is:

1. An information retrieval apparatus for searching a set of information items and displaying results of the search using a self-organizing map, the apparatus comprising:

a graphical user interface configured to display a representation of at least some of the information items as a n-dimensional array of display points within the self-organizing map within a display area, the information items each having a set of characterizing information features which include data representative of one or more video images, a processor configured to train the self-organizing map, using color histograms for each video image, to an effect that a color histogram representing a video image of the information item when applied to an input of the self-organizing map as a feature vector identifies one of a plurality of output nodes, the output nodes being arranged to identify points within the self-organizing map, a user control configured to, in response to a user input, select a plurality of video images and to specify a combination of the plurality of selected video images, and a search processor configured to form a color histogram for each of the user selected video images, to generate a composite color histogram from the specified combination of each of the color histograms from each of the selected video images, to generate a user defined feature vector from the user selected video images using the composite color histogram, to search the set of information items by applying the user defined feature vector to the input of the self-organizing map to identify information items which include video images having color histograms corresponding to that of the user selected video images, and to perform a related search with respect to the user selected video images by identifying, from the self-organizing map, information items which correspond to positions in the array which are neighbouring positions with respect to an array position corresponding to the user selected video images.

2. The information retrieval apparatus as claimed in claim 1, wherein the search processor is configured to search the set of information items in accordance with a search query and to identify information items corresponding to the search query, and a mapping processor is configured to generate map data of information items identified as a result of the search on the search query.

3. The information retrieval apparatus as claimed in claim 1, wherein a number of dimensions n is two, and a position in the array is defined by x, y coordinates.

4. The information retrieval apparatus as claimed in claim 3, wherein the search processor is configured to perform a related search with respect to the user selected video images by identifying information items which correspond to positions in the array which are within a radius of positions from the array position corresponding to the user selected video images.

5. The information retrieval apparatus as claimed in claim 1, wherein the user control is configured to provide the user with a facility for specifying a number of neighbouring positions in accordance with a relative similarity of the information items to be searched by the search processor in the related search, with respect to the array position corresponding to the user selected video images.

6. The information retrieval apparatus of claim 1, wherein the combination of the plurality of selected video images specified by the user control in response to a user input is a Boolean logical combination, the composite color histogram from the specified combination of each of the color histograms being generated from the specified logical combination of color histograms.

7. A computer implemented method for searching a set of information items and displaying results of the search using a self-organizing map, the method comprising:
   displaying a representation of at least some of the information items on an n-dimensional display array of display points within the self-organizing map within a display area, the information items each having a set of characterizing information features which include data representative of one or more video images,
   training the self-organizing map, using color histograms for each video image, to an effect that a color histogram representing a video image of the information item when applied to an input of the self-organizing map as a feature vector identifies one of a plurality of output nodes, the output nodes being arranged to identify points within the self-organizing map,
   selecting a plurality of video images of information items in response to a user input,
   specifying a combination of the plurality of selected video images,
   forming a color histogram for each of the user selected video images,
   generating a composite color histogram from the specified combination of each of the color histograms from each of the selected video images,
   generating a user defined feature vector from the user selected video images using the composite color histogram,
   searching the set of information items by applying the user defined feature vector to the input of the self-organizing map to identify information items which include video images having color histograms corresponding to that of the user selected video images, and
   performing a related search with respect to the user selected video images by identifying, from the self-organizing map, information items which correspond to positions in the array which are neighbouring positions with respect to an array position corresponding to the user selected video images.

8. The method as claimed in claim 7, further comprising:
   searching the information items in accordance with a search query,
   identifying information items corresponding to the search query, and the method further comprises
   generating the self-organizing map of information items identified as a result of the
   searching the information items in accordance with the search query.

9. The method as claimed in claim 7, wherein the number of dimensions n is two, and a position in the array is defined by x, y co-ordinates.

10. The method as claimed in claim 9, wherein the performing the related search comprises performing a related search with respect to the user selected video images by identifying information items which correspond to positions in the array which are within a radius of positions from the array position corresponding to the user selected video images.

11. The method as claimed in claim 10, wherein the selecting includes providing the user with a facility for specifying the radius of positions in accordance with a relative similarity of the information item to be searched by a search processor in the related search, with respect to the array position corresponding to the user selected video images.

12. The method as claimed in claim 7, wherein the specifying the combination of the plurality of selected video images includes specifying a Boolean logical combination of the plurality of selected video images, and the generating the composite color histogram includes combining the color histograms from each of the selected video images in accordance with the specified logical combination.

13. A computer readable storage medium encoded with computer software having program code, which when executed on a computer causes the computer to carry out a method for searching a set of information items and displaying results of the search using a self-organizing map, the method comprising:
   displaying a representation of at least some of the information items on an n-dimensional display array of display points within the self-organizing map within a display area, the information items each having a set of characterizing information features which include data representative of one or more video images,
   training the self-organizing map, using color histograms for each video image, to an effect that a color histogram representing a video image of the information item when applied to an input of the self-organizing map as a feature vector identifies one of a plurality of output nodes, the output nodes being arranged to identify points within the self-organizing map,
   selecting a plurality of video images of information items in response to a user input,
   specifying a combination of the plurality of selected video images,
   forming a color histogram for each of the user selected video images,
   generating a composite color histogram from the specified combination of each of the color histograms from each of the selected video images,
   generating a user defined feature vector from the user selected video images using the composite color histogram,
   searching the set of information items by applying the user defined feature vector to the input of the self-organizing map to identify information items which include video images having color histograms corresponding to that of the user selected video images, and
   performing a related search with respect to the user selected video images by identifying, from the self-organizing map, information items which correspond to positions in the array which are neighboring positions with respect to the array position corresponding to the user selected video images.

* * * * *